United States Patent [19]
Merryman et al.

[11] Patent Number: 5,980,092
[45] Date of Patent: Nov. 9, 1999

[54] METHOD AND APPARATUS FOR OPTIMIZING A GATED CLOCK STRUCTURE USING A STANDARD OPTIMIZATION TOOL

[75] Inventors: Kenneth E. Merryman, Fridley; Kevin C. Cleereman, Moundsview; Kenneth L. Engelbrecht, Blaine, all of Minn.

[73] Assignee: Unisys Corporation, Blue Bell, Pa.

[21] Appl. No.: 08/752,620

[22] Filed: Nov. 19, 1996

[51] Int. Cl.⁶ ................................... G06F 17/50
[52] U.S. Cl. ............................................ 364/489
[58] Field of Search .................... 364/488, 489, 364/490, 491, 578; 395/551, 552, 555, 556, 558

[56] References Cited

U.S. PATENT DOCUMENTS

| | | | |
|---|---|---|---|
| 4,758,953 | 7/1988 | Morita et al. | 364/300 |
| 4,831,543 | 5/1989 | Mastellone | 364/489 |
| 4,918,614 | 4/1990 | Modarres et al. | 364/490 |
| 4,924,430 | 5/1990 | Zasio et la. | 364/578 |
| 5,050,091 | 9/1991 | Rubin | 364/488 |
| 5,095,454 | 3/1992 | Huang | 364/578 |
| 5,164,908 | 11/1992 | Igarashi | 364/491 |
| 5,175,696 | 12/1992 | Hooper et al. | 364/489 |
| 5,222,029 | 6/1993 | Hooper et al. | 364/489 |
| 5,255,363 | 10/1993 | Seyler | 395/164 |
| 5,267,175 | 11/1993 | Hooper | 364/489 |
| 5,341,309 | 8/1994 | Kawata | 364/489 |
| 5,349,659 | 9/1994 | Do et al. | 395/700 |
| 5,355,317 | 10/1994 | Talbott et al. | 384/468 |
| 5,357,440 | 10/1994 | Talbott et al. | 364/467 |
| 5,359,523 | 10/1994 | Talbott et al. | 364/468 |
| 5,359,537 | 10/1994 | Saucier et al. | 364/489 |
| 5,361,357 | 11/1994 | Kionka | 395/700 |
| 5,398,195 | 3/1995 | Kim | 364/491 |
| 5,406,497 | 4/1995 | Altheimer et al. | 364/489 |
| 5,416,721 | 5/1995 | Nishiyama et al. | 364/491 |
| 5,418,733 | 5/1995 | Kamijima | 364/490 |
| 5,418,954 | 5/1995 | Petrus | 395/700 |
| 5,440,720 | 8/1995 | Baisuck et al. | 395/500 |
| 5,448,497 | 9/1995 | Ashar et al. | 364/489 |
| 5,452,239 | 9/1995 | Dai et al. | 364/578 |
| 5,483,461 | 1/1996 | Lee et al. | 364/490 |
| 5,485,396 | 1/1996 | Brasen et al. | 364/491 |
| 5,490,266 | 2/1996 | Sturges | 395/500 |
| 5,490,268 | 2/1996 | Matsunaga | 395/550 |
| 5,491,640 | 2/1996 | Sharma et al. | 364/488 |
| 5,493,508 | 2/1996 | Dangelo et al. | 364/489 |
| 5,507,029 | 4/1996 | Granato et al. | 395/500 |
| 5,572,717 | 11/1996 | Pedersen | 395/555 |
| 5,579,510 | 11/1996 | Wang et al. | 395/500 |
| 5,640,547 | 6/1997 | Hotta et al. | 395/555 |
| 5,644,499 | 7/1997 | Ishii | 364/489 |
| 5,740,067 | 4/1998 | Hathway | 364/489 |
| 5,740,347 | 4/1998 | Avidan | 395/183.09 |
| 5,774,371 | 6/1998 | Kawakami | 364/491 |

OTHER PUBLICATIONS

Tufte, "CML III Bipolar Standard Cell Library", Proceedings of the 1988 Bipolar Circuits and Technology Meeting, Minneapolis, Minnesota, Sep., 1988, p. 180–82.

*Primary Examiner*—Kevin J. Teska
*Assistant Examiner*—Leigh Marie Garbowski
*Attorney, Agent, or Firm*—Charles A. Johnson; Mark T. Starr; Crompton, Seager & Tufte, LLC

[57] ABSTRACT

A method and apparatus for using an optimization tool to optimize a design that uses a gated clock structure. In short, the present invention allows a standard optimizer tool to determine the relative timing of two or more signals that arrive at a logic gate, wherein the logic gate forms a gated clock signal. Typically, standard optimizer tools can only check the relative timing between two or more signals that arrive at a storage element. In accordance with the present invention, selected logic gates may be modeled as a storage element. Thus, a standard optimizer tool may be used to correctly optimize a design that uses a gated clock structure, and in particular, to correctly optimize the logic that provides the clock and enable signals to a clock gating element.

26 Claims, 27 Drawing Sheets

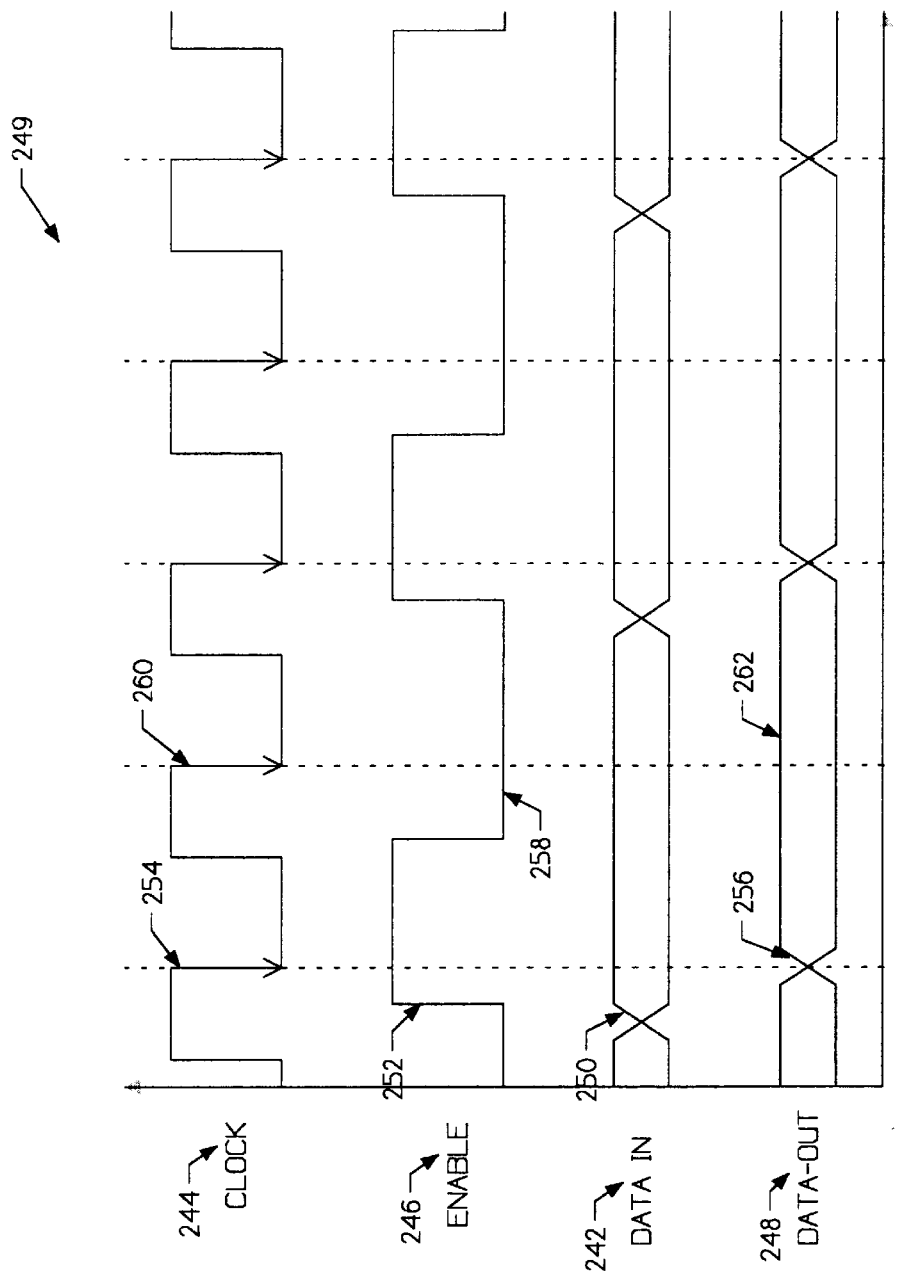

FIRST EXEMPLARY TIMING PARAMETERS — 450

452

| ID | PARAMETER | CLOCK EDGE | VALUE |
|---|---|---|---|
| A | SETUP | LH | DESIRED OVERLAP |
| B | HOLD | HL | DESIRED OVERLAP |

AND

462

| ID | PARAMETER | CLOCK EDGE | VALUE |
|---|---|---|---|
| C | SETUP | HL | CLK PULSE WIDTH |

OR

| D | HOLD | LH | CLK PULSE WIDTH |

SECOND EXEMPLARY TIMING PARAMETERS — 464

466

| ID | PARAMETER | CLOCK EDGE | VALUE |
|---|---|---|---|
| A | SETUP | LH | DESIRED OVERLAP |
| E | HOLD | LH | DESIRED OVERLAP + CLK PULSE WIDTH |

OR

468

| B | HOLD | HL | DESIRED OVERLAP |
|---|---|---|---|
| F | SETUP | HL | DESIRED OVERLAP + CLK PULSE WIDTH |

FIG. 13

METHOD AND APPARATUS FOR OPTIMIZING A GATED CLOCK STRUCTURE USING A STANDARD OPTIMIZATION TOOL

CROSS REFERENCE TO CO-PENDING APPLICATIONS

The present application is related to U.S. Pat. application Ser. No. 08/524,017, filed Aug. 29, 1995, entitled "A Method of Stabilizing Component and Net Names of Integrated Circuits In Electronic Design Automation Systems", U.S. Patent application Ser. No. 08/752,617, filed Nov. 19, 1996, entitled "Method and Apparatus for Incrementally Optimizing a Circuit Design", U.S. Patent application Ser. No. 08/752,619, filed Nov. 19, 1996, entitled "Method and Apparatus For Providing Optimization Parameters to a Logic Optimizer Tool", U.S. Patent application Ser. No. 08/752,616, filed Nov. 19, 1996, entitled "Method and Apparatus for Identifying Gated Clocks Within a Circuit Design Using a Standard Optimization Tool", U.S. Patent application Ser. No. 08/752,618, filed Nov. 19, 1996, entitled "Method and Apparatus for Optimizing a Circuit Design Having Multi-Cycle Clocks Therein", U.S. Patent application Ser. No. 08/752,621, filed Nov. 19, 1996, entitled "Method and Apparatus for Monitoring the Performance of a Circuit Optimization Tool", all assigned to the assignee of the present invention, and all incorporated herein by reference.

BACKGROUND OF THE INVENTION

1. Field of the Invention

This invention relates generally to electronic design automation (EDA) systems used for designing integrated circuits. The invention is more specifically related to a method and apparatus for optimizing a gated clock structure using a standard EDA optimization tool during the integrated circuit design process.

2. Description of the Prior Art

The design process for all integrated circuits is composed of several discrete operations. Initially, the proposed functionality for a circuit is analyzed by one or more chip designers. These designers define the logical components of the circuit and their interactions by specifying the logic design using design capture tools. These design capture tools are commonly implemented in software executing on an engineering workstation, with well-known input devices being used to receive design information from the chip designer, and output devices, such as computer displays, being used to provide visual feedback of the design to the designer as it is being constructed. Such software is typically implemented as part of an electronic design automation (EDA) system. Specifically, the design entry operation involves generating a description of the logic design to be implemented on the circuit chip in an appropriate machine readable form. Chip designers generally employ hierarchial design techniques to determine the appropriate selection and interconnection of logic and/or memory devices which will enable the chip to perform the desired function. These techniques involve describing the chip's functionality at various levels of abstraction, ranging from the most general function performed by the chip to the precise functions performed by each logic and/or memory element on the chip.

A common method for specifying the integrated circuit design is the use of hardware description languages. This method allows a circuit designer to specify the circuit at the register transfer level (also known as a "behavior description"). Using this method, the circuit is defined in small building blocks. The names of the building blocks are specified by the circuit designer. Thus, they usually are logical names with specific functional meaning.

Encoding the design in a hardware description language (HDL) is a major design entry technique used to specify modern integrated circuits. Hardware description languages are specifically developed to aid a designer in describing a circuit. These languages often contain specific functions and syntax to allow complex hardware structures to be described in a compact and efficient way.

It is useful to distinguish between those components of an integrated circuit design called cells, provided by a silicon chip vendor as primitive cells (i.e., leaf candidates), and the user-defined hierarchy blocks built upon them. One way is to speak of a "cell library" vs. a "design library" as two separate libraries, both of which are available to subsequent designs. Alternatively, at least initially, a design library contains a cell library. A cell library is a database containing detailed specifications on the characteristics of each logical component available for use in a design. Initial cell library contents are usually provided by the chip vendor. The components in the cell library are identified by the generic description of the component type. For example, the term "NAND" for a NAND gate is its type description and distinguishes this component from others such as OR gates, flip-flops, multiplexors, and so on. A two-input NAND gate might be of type 2NAND. When a 2NAND component is specified as part of a given circuit design, it is given an instance name, to distinguish it from all other 2NAND gates used in the circuit. The instance name typically includes the instance names of all parent instances by concatenation when defining the instance in the context of the chip.

A single name is sufficient when dealing only in the context of a single user function. The user-defined blocks can then be used to design larger blocks of greater complexity. The user-defined blocks are added to the design library, which grows from the additions of new design modules as the design evolves. The top level of the design hierarchy may be a single block that defines the entire design, and the bottom layer of the hierarchy may consist of leaf cells, the cells (i.e., the logical components) that were originally provided in the cell library. The resulting design is often called a detailed (or gate-level) description of the logic design.

The generation of the detailed description is often accomplished by logic design synthesis software for HDL entry. The logic design synthesis software generates a gate-level description of user-defined input and output logic, and also creates new gate-level logic to implement user-defined logical functions. Typically, the logic design synthesis software is executed many times during the integrated circuit design process, because errors may be detected during the simulation and testing phases of the design cycle and then fixed in the behavioral description.

The output of the design capture and synthesis tools is typically a logic design database which completely specifies the logical and functional relationships among the components of the design. Once the design has been converted into this form, it may be optimized by sending the logic design database to a logic optimizer tool typically implemented in software.

In many logic optimizer tools, the optimization process may include a characterization step and an optimization step. During the characterization step, various optimization parameters are assigned to selected portions of the design. For example, for those portions of the design that are to be optimized for timing, the characterization step may perform a timing analysis of the design, and identify critical paths within the design that need to be improved by optimization. The characterization step may then assign timing constraints to those portions of the design, indicating the degree that they must be optimized to meet the desired timing goals.

After the characterization step is complete, the optimizer tool may perform an optimization step. The optimization step typically attempts to optimize the design such that all of the timing constraints assigned by the characterization step are satisfied. During the optimization step, the logic optimizer may, for example, remove logic from the design that is unnecessary, minimize the logic that is necessary to implement certain functions, increase the power of selected cells to improve performance, etc.

After the design has been optimized, the circuit designers typically verify that the resulting logic definition is correct and that the integrated circuit implements the expected function. This verification is currently achieved by timing and simulation software tools. The design undergoes design verification analysis in order to detect flaws in the design. The design is also analyzed by simulating the design to assess the functionality of the design. If errors are found or the resulting functionality is unacceptable, the designer modifies the behavior description as needed. These design iterations help to ensure that the design satisfies the desired requirements.

After timing verifications and functional simulation have been completed on the design, placement and routing of the design's components is performed. These steps involve allocating components of the design to locations on the integrated circuit chip and interconnecting the components to form nets. Finally, final timing verification is performed after placement and routing is complete.

A problem in the above design process may occur when gated clocking schemes are used in the design. That is, typical logic optimizer tools can only handle standard clocking schemes, such as where a number of clock signals are independently generated and distributed through the system. For high performance designs, however, it is often desirable to use gated clocking schemes to increase the density and performance of the design. Because of the design difficulties associated with generating and routing a number of independent clock signals, it has been found that a gated clocking scheme can increase the performance of a design by as much as 10–20 percent over the standard clock schemes.

In a gated clock scheme, both a clock enable signal and a clock signal may be provided to a logic gate, wherein the output of the logic gate may provide a "gated clock" signal to corresponding storage elements. For the proper operation of the design, however, the clock enable signal must typically arrive at the logic gate within a predetermined time relative to the clock signal. Otherwise, the gated clock signal may not have the expected clock pulse width, or may be susceptible to clock glitching that may upset the desired state of the system. Standard optimization tools typically do not have the capability of checking the relative timing of signals arriving at a logic gate. Rather, standard optimization tools typically only have the capability to check the relative timing between signals that arrive at a storage element, such as a register, by using setup and hold times that are defined for the storage element.

Despite the forgoing limitations, the use of standard logic optimizer tools has a number of advantages. For example, standard logic optimizer tools are readily available from a number of vendors, including Synopsys, Inc. Further, standard logic optimizer tools may be more reliable than a custom logic optimizer tool because widespread use by a number of users may have identified many software bugs or limitations. These software bugs and limitations are often corrected by the software vendor in a timely manner. For these and other reasons, it can be desirable to use a standard logic optimizer tool in the above-referenced design process. Of course, a logic optimizer tool that can correctly optimize designs that use gated clocks would also be desirable.

In view of the foregoing, one skilled in the art would recognize that a logic optimizer tool that can correctly optimize a design that use gated clocking schemes would be a valuable advance in the art. Further, one skilled in the art would recognize that a design process that uses a standard logic optimizer to correctly optimize a design that uses a gated clocking scheme would be a valuable advance in the art.

SUMMARY OF THE INVENTION

The present invention overcomes many of the disadvantages of the prior art by providing a method and apparatus for correctly optimizing a design that uses a gated clocking scheme. This may be accomplished by either providing an improved logic optimizer tool that can correctly optimize the gated clock designs, or by modeling the gated clocks such that a standard logic optimizer tool can correctly optimize the design.

In an exemplary embodiment, the present invention provides a method and apparatus for using an optimization tool to check the relative timing of two or more signals arriving at a logic gate. As indicated above, typical standard optimizer tools can only check the relative timing between two or more signals if they all arrive at a single storage element. To overcome this difficulty, and in accordance with the present invention, the logic gate may be modeled as a storage element. Thus, a standard optimizer tool may be used to correctly optimize the resulting design. Since the standard optimizer tool can check the relative timing between signals that arrive at a storage element, the standard optimizer tool may properly check the relative timing between the signals arriving at the logic gate.

More specifically, and in another exemplary embodiment, the present invention contemplates modeling the logic element as a storage element, and optimizing the circuit design using a standard optimization tool, wherein the standard optimization tool optimizes the circuit design such that a first signal arrives at the storage element within a predefined time period of a second signal. It is contemplated that the predefined time period may be defined by a setup time, a hold time, or a combination thereof. It is further contemplated that the logic element may be actually replaced with a storage element, rather than merely modeled as a storage element.

In a preferred embodiment, the logic gate may be part of a clock tree and may receive both a clock signal and a clock control signal. The clock signal may provide a clock pulse wherein the clock pulse may have a leading edge, a trailing edge, and a clock pulse width. Similarly, the clock control signal may provide a clock control pulse. For proper operation, it may be desirable for the clock control pulse to overlap the leading edge of the clock pulse by a desired leading overlap amount and overlap the trailing edge of the clock pulse by a desired trailing overlap amount.

The present invention contemplates modeling the logic element as a storage element, and optimizing the clock tree, and clock control logic using a standard optimization tool. Because the logic gate is modeled as a storage element, rather than a logic element, a standard optimization tool may optimize the clock control logic such that the control pulse overlaps the leading and trailing edges of the clock pulse by the desired overlap amounts. In a preferred embodiment, the desired overlap amounts may be defined by properly defining setup and hold times for the storage element.

It is also contemplated that a standard optimization tool may be modified to correctly optimize gated clock structures. In an illustrative embodiment, a standard optimization tool may be modified such that relative timing between signals that arrive at identified logic gates can be checked, and the design may be optimized accordingly. This may be accomplished in any number of ways including providing a routine that allows timing parameters, similar to setup and hold parameters, to be associated with logic gates. These timing parameters may then be used to check the relative timing between corresponding signals that arrive at the logic gates.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8B is a timing diagram for the circuit shown in FIG. 8A;

FIG. 13 is a table showing exemplary setup and hold time definitions for the model shown in FIG. 12;

DETAILED DESCRIPTION OF THE PREFERRED EMBODIMENTS

Figure 1:
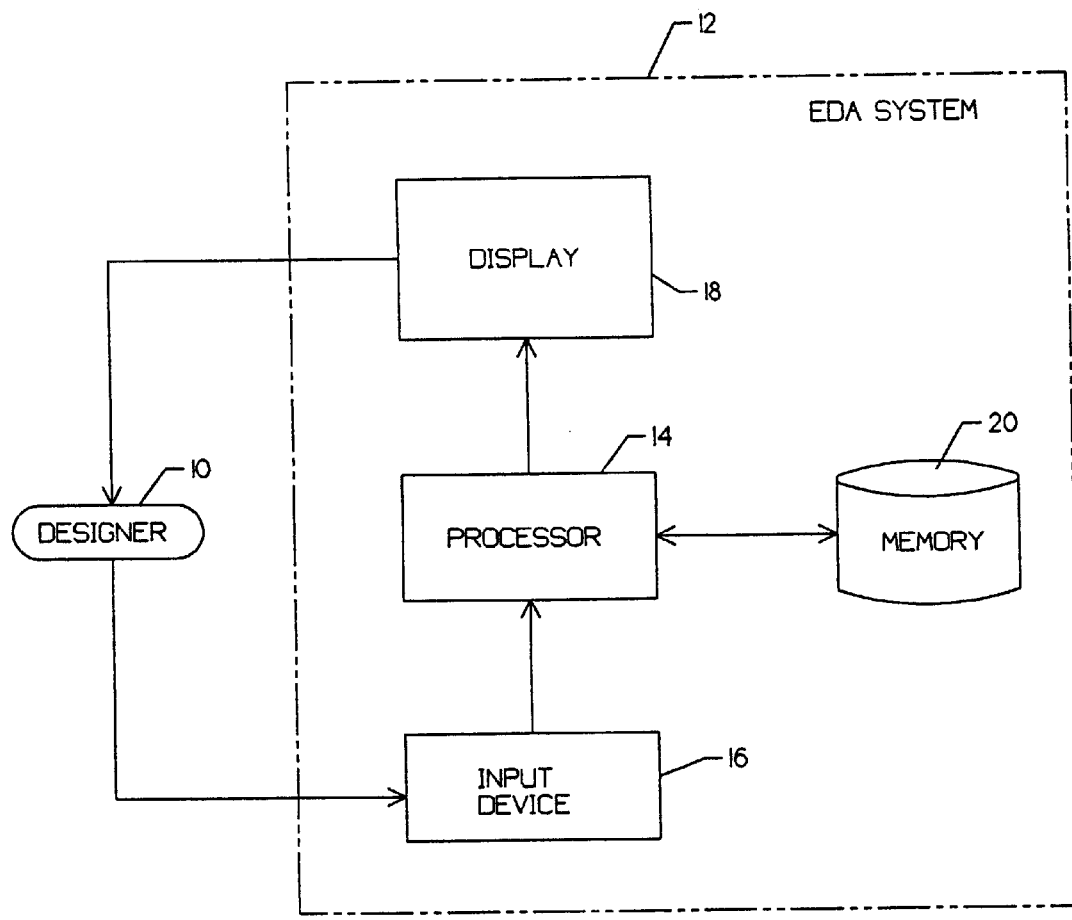
FIG. 1 is a block diagram of the computer-based environment of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

In sum, the present invention preferably is implemented for practice by a computer, e.g., a source code expression of the present invention is input to the computer to control operations therein. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system can be made for many reasons.

FIG. 1 is a block diagram of the computer-based environment of the present invention. A Designer 10 interacts with an Electronic Design Automation (EDA) System 12 to enter an integrated circuit design, validate the design, place the design's components on a chip, and route the interconnections among the components. The integrated circuit may be an application specific integrated circuit (ASIC). The EDA System 12 includes a Processor 14, which executes operating system software as well as application programs known as EDA software. The Processor is found in all general purpose computers and almost all special purpose computers. The EDA System 12 is intended to be representative of a category of data processors suitable for supporting EDA operations. In the preferred embodiment, the EDA System is a HP A1097C Series 700 engineering workstation, commercially available from Hewlett-Packard Corporation, although other engineering workstations or computer systems from manufacturers such as Sun Microsystems, Inc. may also be used.

The Designer 10 enters design information into the EDA System by using a well-known Input Device 16 such as a mouse, keyboard, or a combination of the two devices. It should be understood, however, that the Input Device may actually consist of a card reader, magnetic or paper tape reader, or other well-known input device (including another computer system). A mouse or other cursor control device is typically used as an Input Device as a convenient means to input information to the EDA System to select command modes, edit input data, and the like. Visual feedback of the design process is given to the Designer by showing the design being constructed as graphical symbols on Display 18. The Display is used to display messages and symbols to the Designer. Such a Display 18 may take the form of any of several well-known varieties of CRT displays. The EDA software being executed by the Processor 14 stores information relating to logic design in Memory 20. The Memory may take the form of a semiconductor memory, magnetic disks, optical disks, magnetic tape or other mass storage device.

Figure 2:
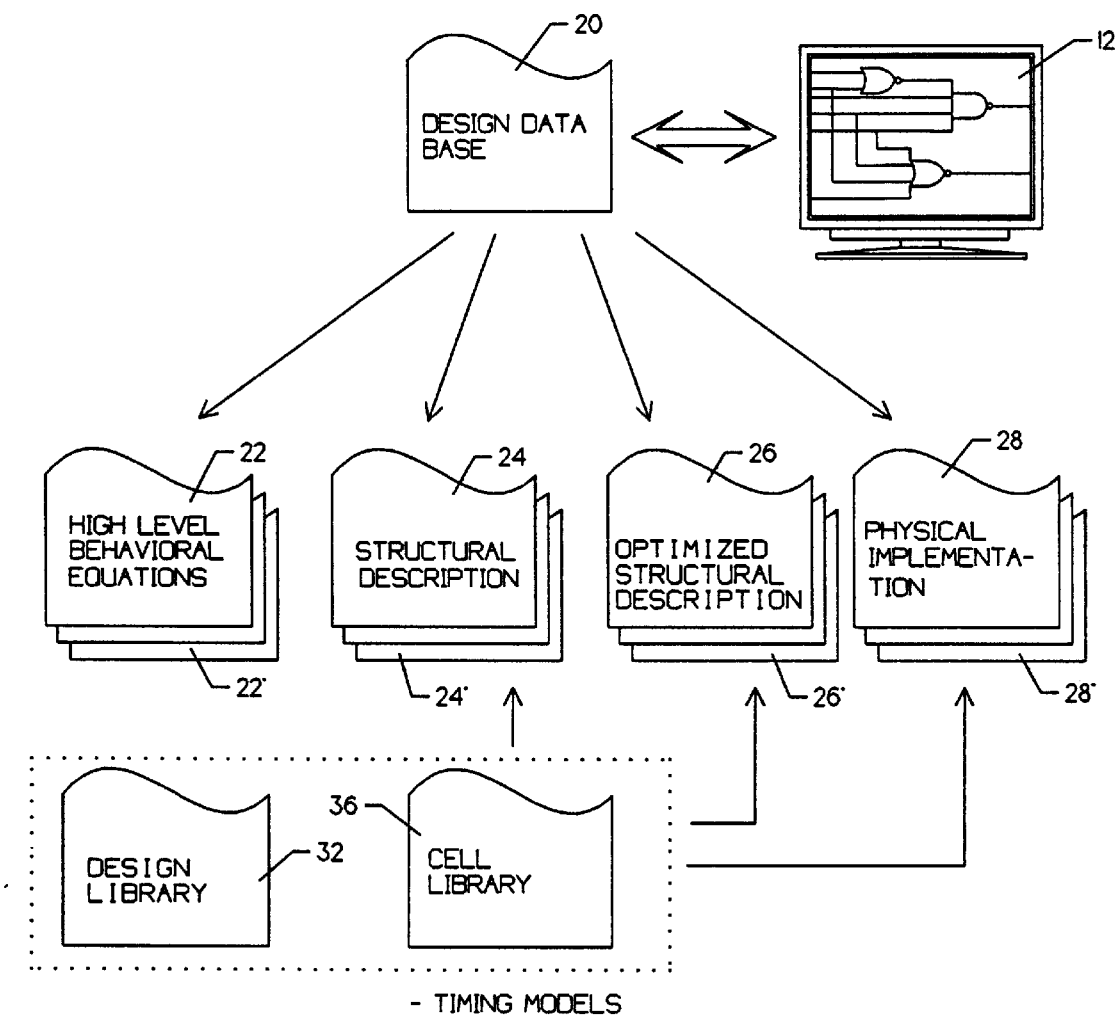
FIG. 2 is a block diagram showing typical circuit representations stored within a circuit design database.

FIG. 2 is a block diagram showing a number of circuit representations stored within a typical circuit design database. The design database 20 may include a high level behavioral representation 22, a structural description representation 24, an optimized structural representation 26, and a physical representation 28. Further, the database may include previous revisions of the high level behavioral representation 22', a structural description representation 24', an optimized structural representation 26', and a physical representation 28'.

As indicated above, the circuit designer typically specifies the logic design of an integrated circuit by using design capture software that runs on an EDA system 12. In the preferred embodiment, the Hardware Computer-Aided Design System (HCADS), available from Unisys Corporation, is used as Design Capture software, although other design capture programs from companies such as Cadence Design Systems, Inc., Synopsys, Inc., and Mentor Graphics, Inc., are also commercially available. At a minimum, when using a hardware description language, any text editor program may be used to specify the design. The result of this activity is a high level behavior description representation 22, which typically represents the logic design as specified at the register transfer level. Items in the high level behavior description representation 22 may map to functional components of the design. In the preferred embodiment, the high level behavior description representation 22 is written in a design language called Universal Design Source Language (UDSL), although other existing, well-known hardware design languages could also be used.

Figure 9A:
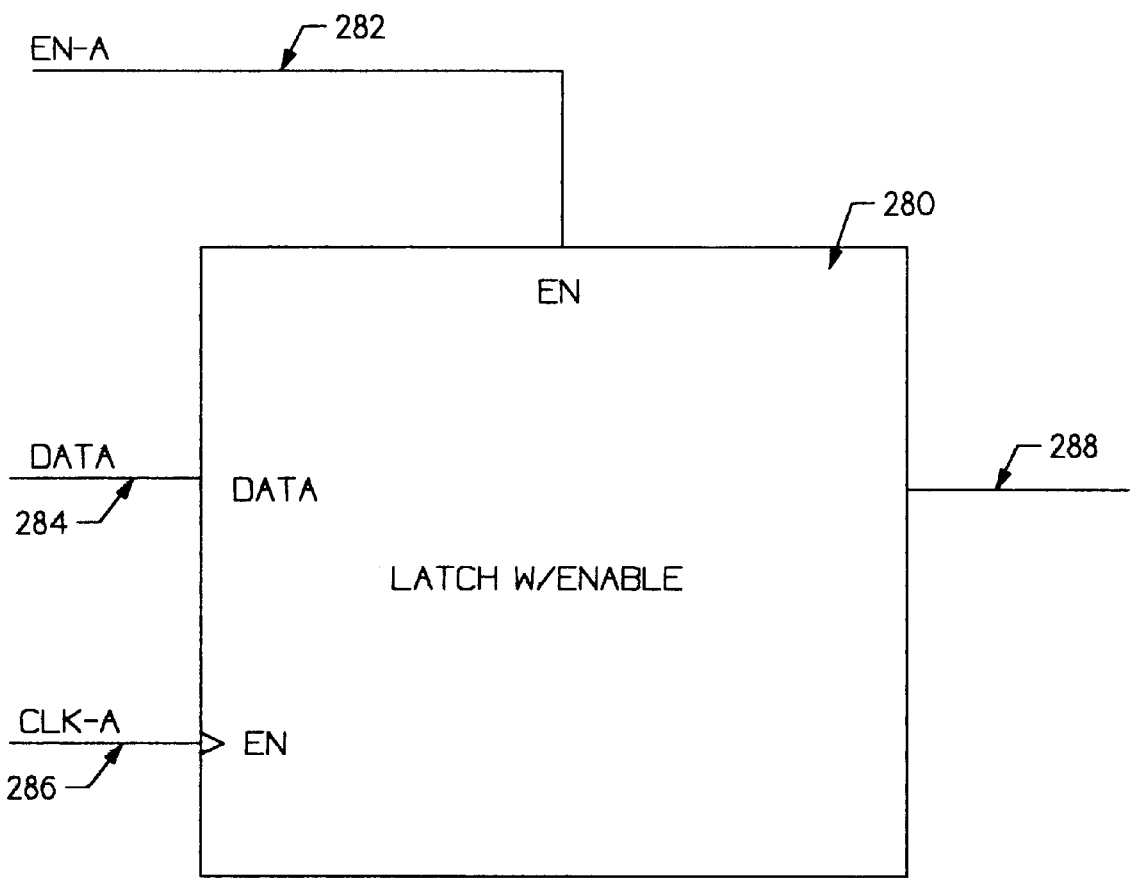
FIG. 9A is a schematic diagram showing a typical model for a latch with enable, and that the model encompasses the gated clock thereby avoiding the timing difficulty associated therewith.
Figure 9B:
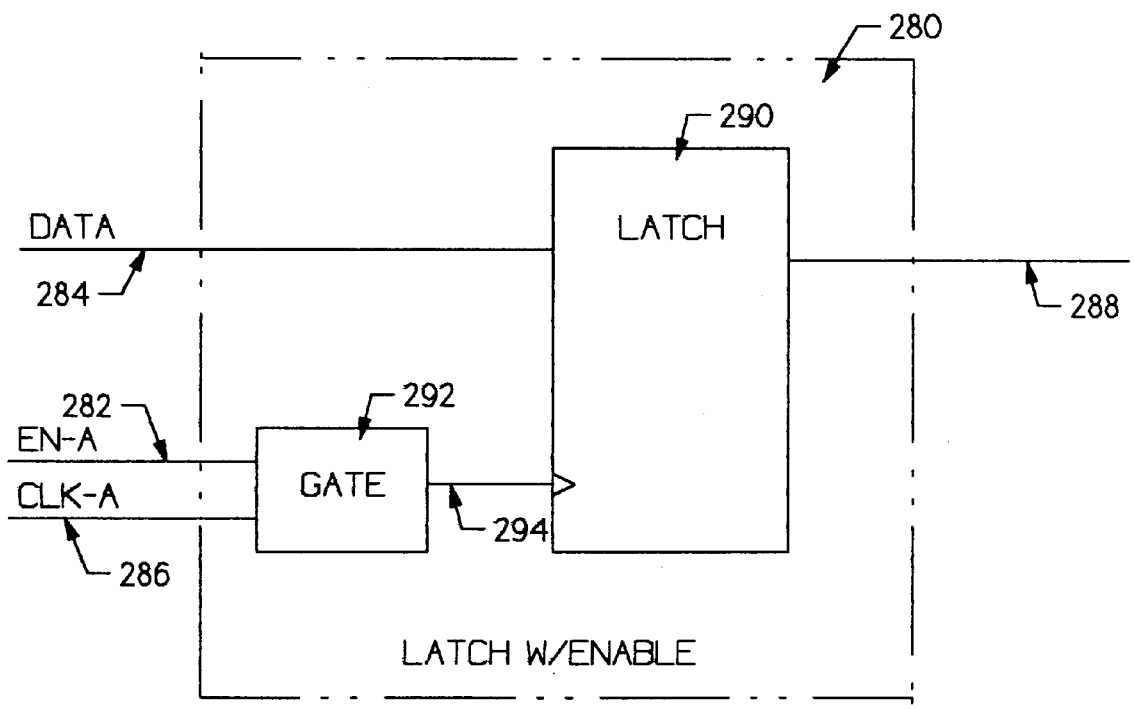
FIG. 9B is an illustrative implementation of the Latch with Enable block shown in FIG. 9A.

The high level behavior description representation 22 may be input to a logic design synthesis tool (see for example, FIG. 9). The logic design synthesis tool may assign the gates and other circuitry needed to implement the functions specified by the high level behavior description representation 22. In the preferred embodiment, the synthesis software is the Behavior to Structure Translator (BEST) synthesis tool developed by Unisys Corporation. However, alternate embodiments such as the VHDL Design Compiler commercially available from Synopsys, Inc., the DesignBook Synthesis tool from Escalade, and the Synergy synthesis tool available from Cadence Design Systems, Inc. may also be used.

The Logic Design Synthesis tool may output a structural description representation 24, which is sometimes referred to as the netlist for the design. This file contains the gate-level definition of the logic design. The structural description representation 24 may be in the Prime Behavior Description Language ('BDL), a format developed and used by the Unisys Corporation.

The structural description representation 24 may be provided to other EDA software programs, including an optimization program. The circuit optimization program may read the structural description representation 24 and optimize the logic represented therein. Typically, the optimization tool may read and write Electronic Data Interchange Format (EDIF) files. The EDIF format is an industry standard format for hardware design language information. Thus, embedded within a typical optimization program is an EDIF reader and an EDIF writer. The EDIF writer and reader translate the circuit design database 20 from an internal format to and from the EDIF format.

The optimization methodology used by the optimization program may be selectable by the user. For example, the user may direct the optimization tool to optimize a particular portion of the circuit design such that power, area, speed or other predefined parameters are optimized.

The optimization program may optimize the structural description representation 24 using components from a selected cell library 30 or design library 32. The optimization program may provide an optimized structural description representation, as shown at 26. In the preferred embodiment, the optimization program is the Design Compiler, commercially available from Synopsys, Inc.

The optimized structural description representation 26 may then be placed and routed using a commercially available place and route tool. In the preferred embodiment, the place and route tool is provided by Cadence Design Systems, Inc. is utilized, although other firms active in the electronic design automation (EDA) industry all sell systems similar in function to the above-mentioned Cadence tool.

The result may be stored in the circuit design database 20 as a physical implementation representation 28. Typical cell libraries include a number of representation of each component therein including a symbol representation, a schematic representation and a physical representation. This may also be true for selected components in the design library 32. The physical implementation representation 28 of the circuit design database 20 typically includes references to the physical representation of the library components referenced therein.

Figure 3:
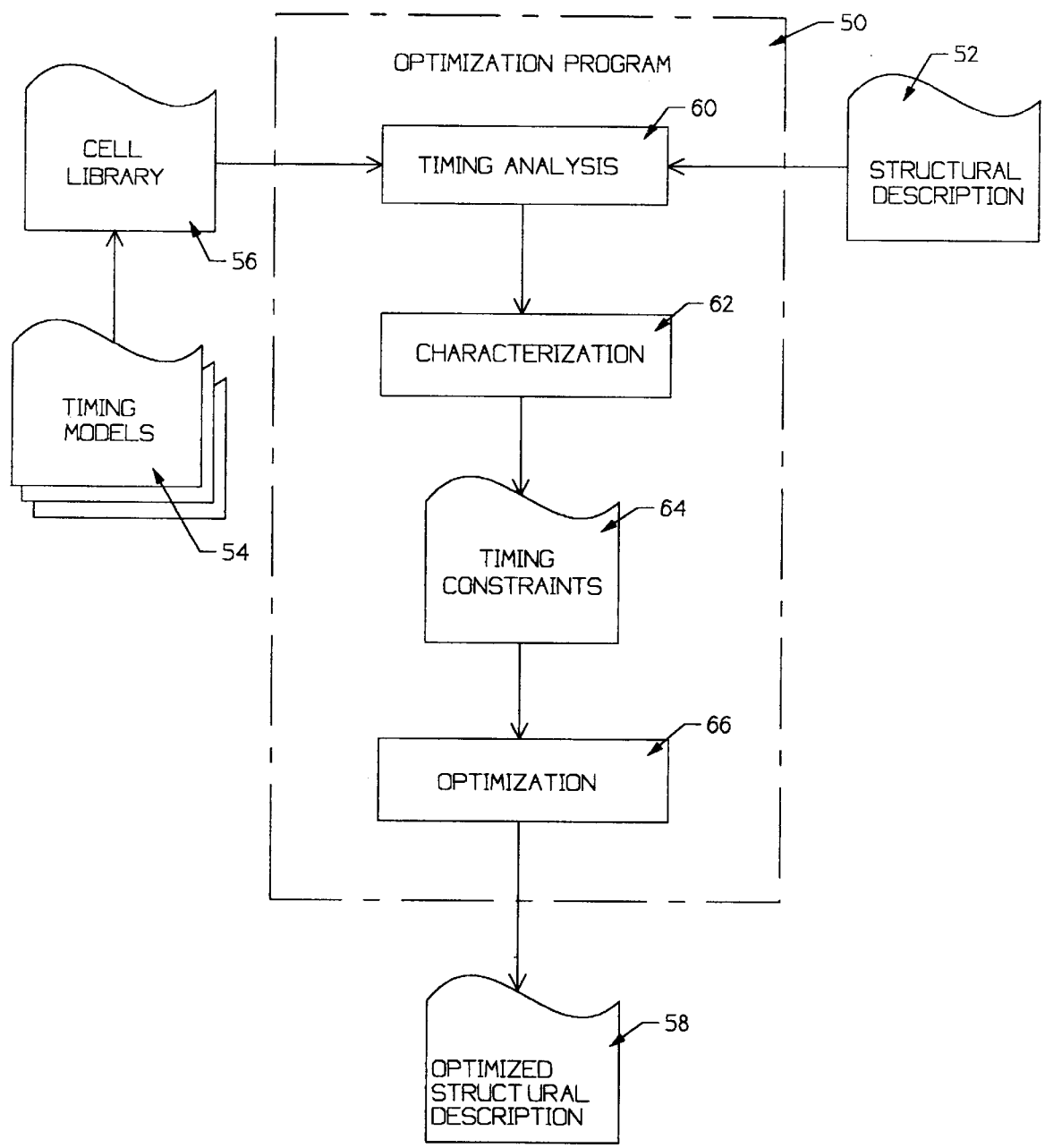
FIG. 3 is a block diagram that illustrates the operation of a standard optimization program.

FIG. 3 is a block diagram that illustrates the operation of a standard optimization program 50. The standard optimization program 50 may read a structural description 52 of a desired circuit design. The standard optimization program 50 may further read timing models 54 from cell library 56, as shown. The standard optimization program 50 may then optimize the design and provide an optimized structural description 58.

More specifically, the standard optimization program 50 may include a timing analysis block 60, a characterization block 62, and an optimization block 66. The timing analysis block 60 may read the structural description 52, as described above. Typically, the structural description 52 describes the design using components from cell library 56. Thus, the timing analysis block 60 may read the necessary timing models 54 for each of the components from cell library 56. The timing analysis block 60 may then perform a timing analysis of the design and identifies the critical paths therein.

The characterization block 62 may read the results of the timing analysis block 60 and assigns various optimization parameters to selected portions of the design. For example, for those portions of the design that are to be optimized for timing, the characterization block 62 may assign timing constraints 64 to those portions of the design that lie in the critical paths. The timing constraints 64 assigned by the characterization block 62 typically indicate the degree that each of the associated portions of the design must be optimized to meet the desired timing goals of the overall design.

Optimization block 66 may read the timing constraints 64, and attempt to optimize the design such that all of the timing constraints assigned by the characterization block 62 are satisfied. During optimization, the logic optimization program 50 may, for example, eliminate redundant logic, minimize logic implementation, increase the power of selected cells to improve performance, etc. After optimization, the optimization block 66 may provide an optimized structural description 58, as shown.

Figure 4A:
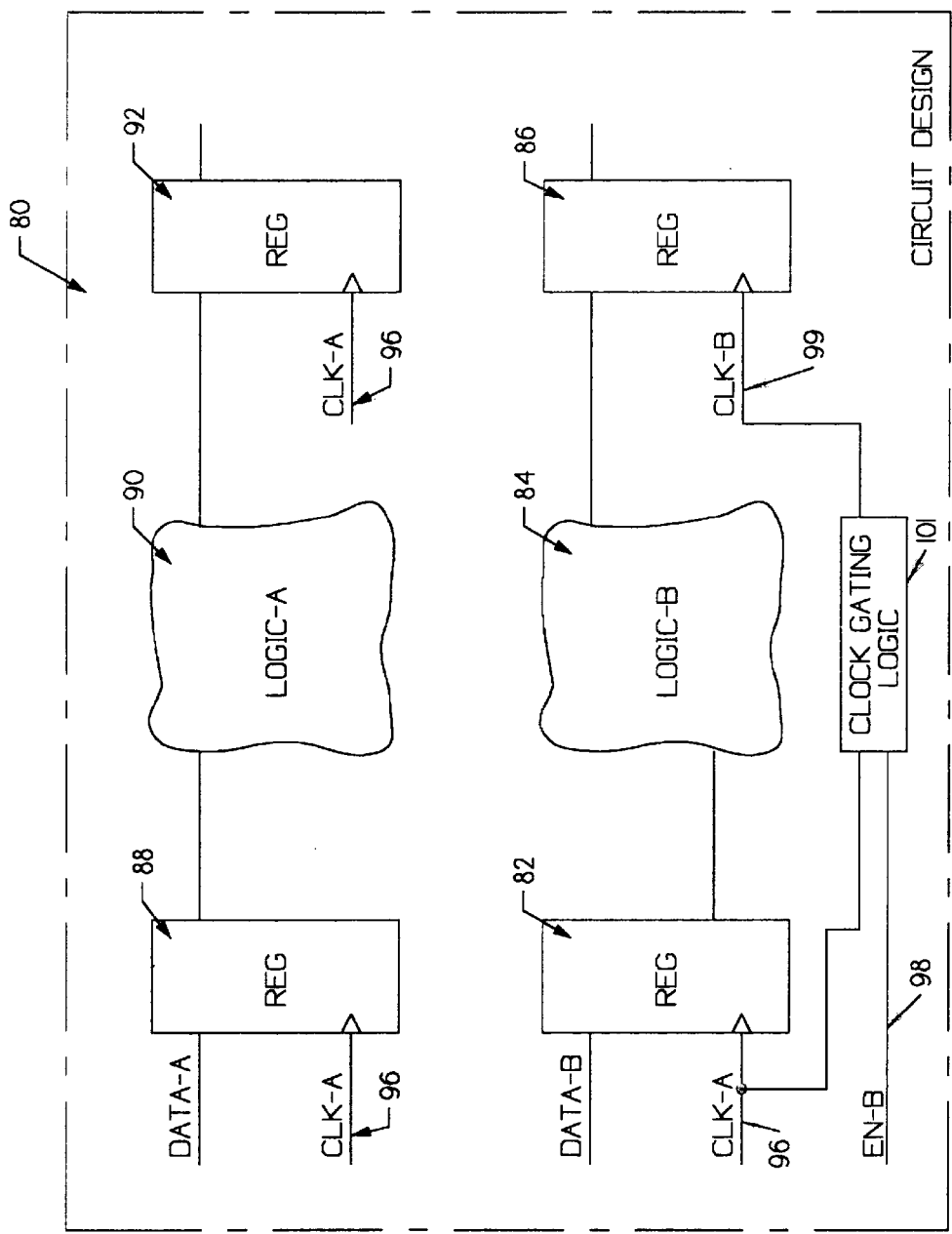
FIG. 4A is a block diagram of a circuit design that uses a gated clock scheme.
Figure 4B:
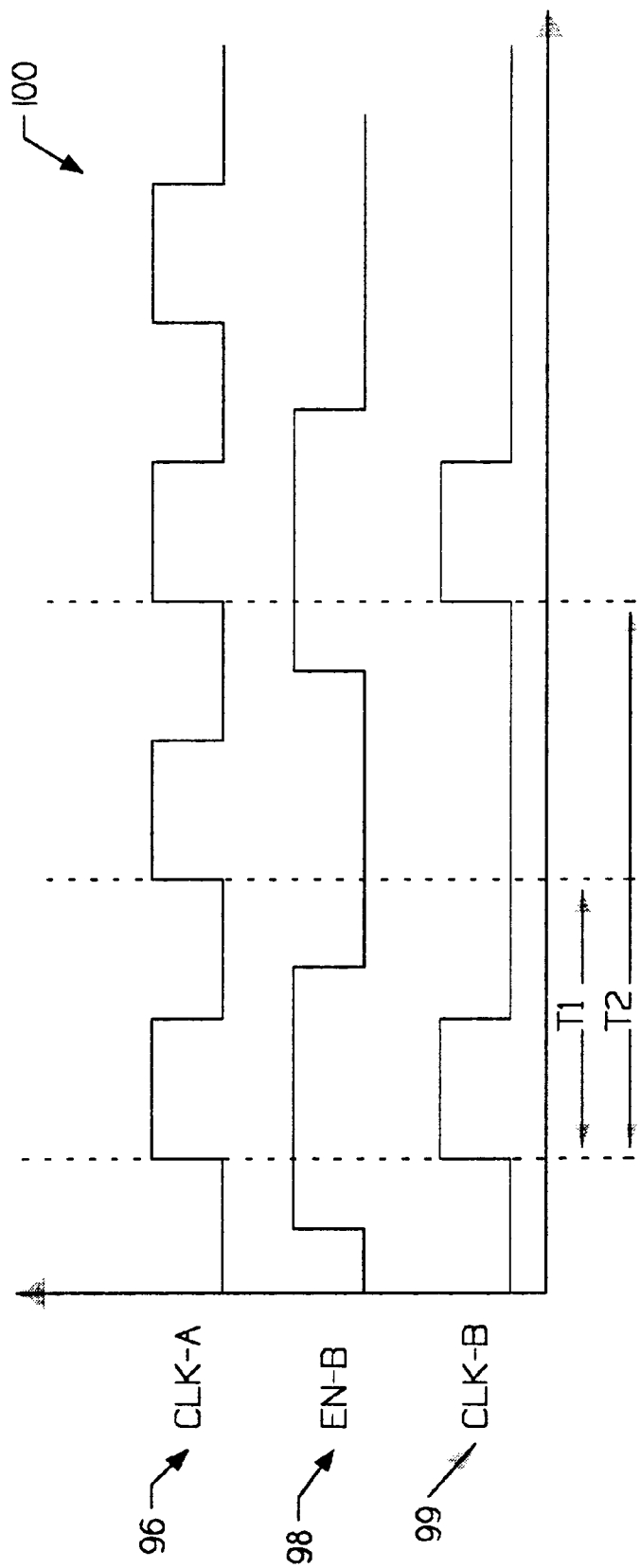
FIG. 4B is a timing diagram for the circuit shown in FIG. 4A.

FIG. 4 is a block diagram of a circuit design that uses a gated clock scheme. The illustrative circuit design shows a first register 88, a second register 92 and a third register 82 that are all clocked by a first clock signal clk-A 96. A fourth register 86 is controlled by a gated clock, as described below. The first register 88 provides data to the second register 92 through a logic-A block 90. Similarly, the third register 82 provides data to the fourth register 86 through a logic-B block 84.

In a gated clocking scheme, both a clock enable signal and a clock signal are provided to a clock gating logic block, wherein the output of the clock gating logic block may provide a "gated clock" signal to selected storage elements. In the illustrative circuit design, the clk-A signal 96 is provided to clock gating logic block 101, and the output of the clock gating logic block 101 (i.e. clk-B 99) is provided to the fourth register 86.

Referring now to the timing diagram generally shown at 100. Clock-A 96 is shown having a clock period of "T1". Thus, the data released by the first register 88 must traverse through the logic-A block 90 and arrive at the second register 92 within a time period of "T1" (e.g. within one clock period of clock-A 96), neglecting setup times. In contrast, the third register is clocked by clk-A 96 and the fourth register 86 is clocked by clk-B 99. Clk-B 99 is a gated clock, and is generated by logically gating clk-A 96 and en-B 98. For illustration purposes, the en-B signal 98 is provided with a period twice that of the clk-A signal 96. Also, the en-B signal 98 substantially overlaps the corresponding clock pulses of the clk-A signal 96, as shown.

The logical gating (e.g. ANDING) of the clk-A signal 96 and the en-B signal 98 results in the clk-B signal 99, which has a clock period of "T2", which in this case is twice that of the clock period of the clk-A signal 96. Thus, the propagation time that is allowed between the third register 82 and the fourth register 86 is twice that of the propagation time between the first register 88 and the second register 92.

An advantage provided by a gated clock is that the clock period provided to a particular set of registers may more closely match the expected maximum propagation time of the logic therebetween. In designs that only use a single-cycle clocking scheme, the clock period must be set to accommodate the worst case propagation time in the design. A gated clock design is not subject to this same limitation.

Figure 5A:
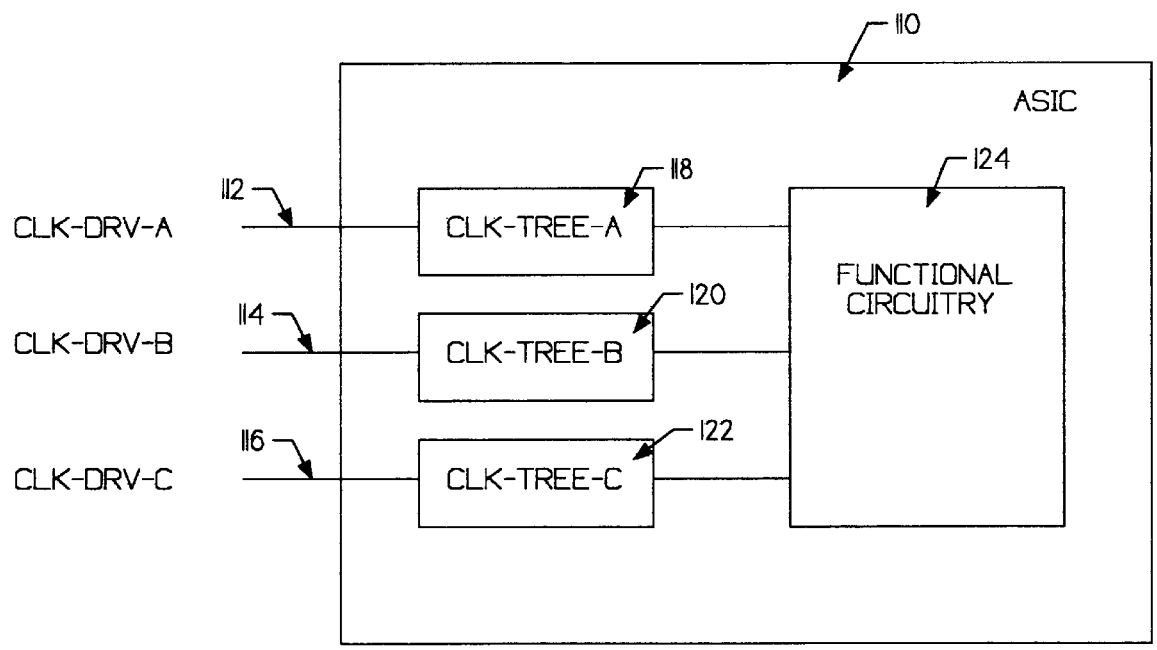
FIG. 5A is a schematic diagram showing a number of exemplary clock trees, wherein each clock tree is used to generate a different one of a number of clocks.
Figure 5B:
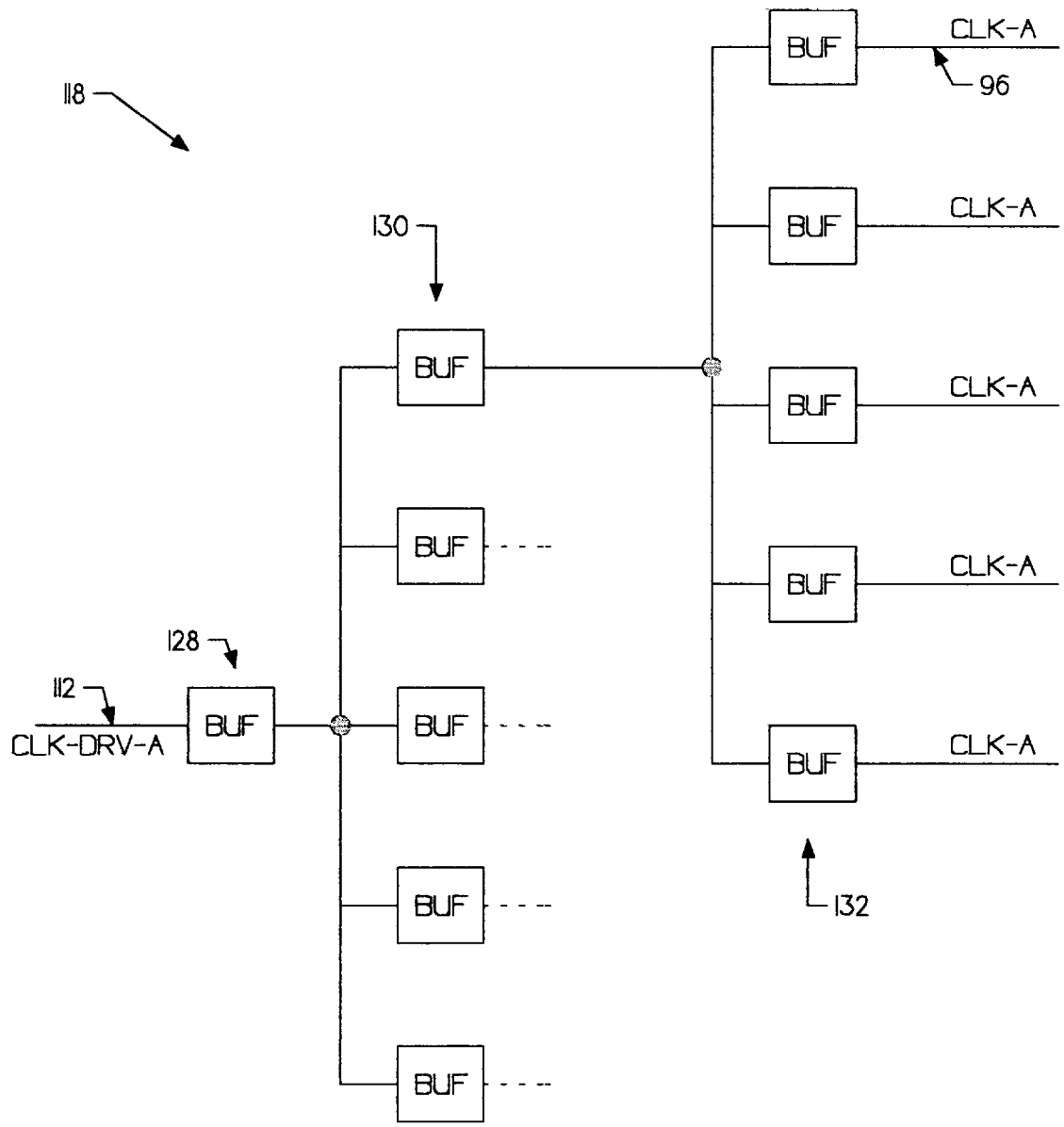
FIG. 5B is a schematic diagram showing an illustrative clock tree of FIG. 5A.

FIG. 5 is a schematic diagram showing a number of exemplary clock trees, wherein each clock tree is used to generate a different one of a number of clocks. In the illustrative diagram, an application specific integrated circuit (ASIC) is shown at 110. The ASIC 110 may have a number of different clock signals provided thereto. For example, ASIC 110 may have three clock signals driven thereon, namely, CLK-DRV-A 112, CLK-DRV-B 114, and CLK-DRV-C 116. Each of the clock signals may have a different clock period and may drive different portions of the functional circuitry 124.

Each of the clock signals, for example CLK-DRV-A 112, is driven onto the ASIC,110 and provided to a clock tree, for example CLK-TREE-A 118. Each of the clock signals 112, 114 and 116 have a corresponding clock tree 118, 120 and 122, respectively. The clock trees are required to provide the necessary fan out to the corresponding clock signal to drive the functional circuitry 124.

An exemplary implementation of CLK-TREE-A 118 is shown in the lower portion of FIG. 5. The CLK-DRV-A signal 112 is provided to a buffer as shown at 128. The output of buffer 128 is provided to the inputs of a number of other buffers as shown at 130. Thus, the CLK-DRV-A signal 112 is fanned out to five separate buffer elements. Typically, there are design rules which define the maximum fan out allowed for each buffer element. In the illustrative embodiment, the buffer element shown at 128 has a maximum fan out drive capability of five.

Each of the buffers shown at 130 may then be fanned out to five more buffer elements as shown at 132. This may be continued until there is a sufficient number of buffers to drive the required registers or latches in the functional circuitry 124. In the illustrative embodiment shown at 118, only three levels of the clock tree are shown. However, it is recognized that in complex designs, the clock trees may exceed three levels, and may have six or more levels.

As can readily be seen, each of the clocks is independently generated and distributed throughout the design. A limitationof this implementation is that it may be difficult to control the clock skew between each of the clock signals, particularly when the clock trees are automatically placed and routed. Further, because a complete clock tree must be maintained for each clock signal, for example CLK-DRV-A 112, it is evident that the clock trees may represent a relatively large overhead in both chip real estate and chip power.

Figure 6A:
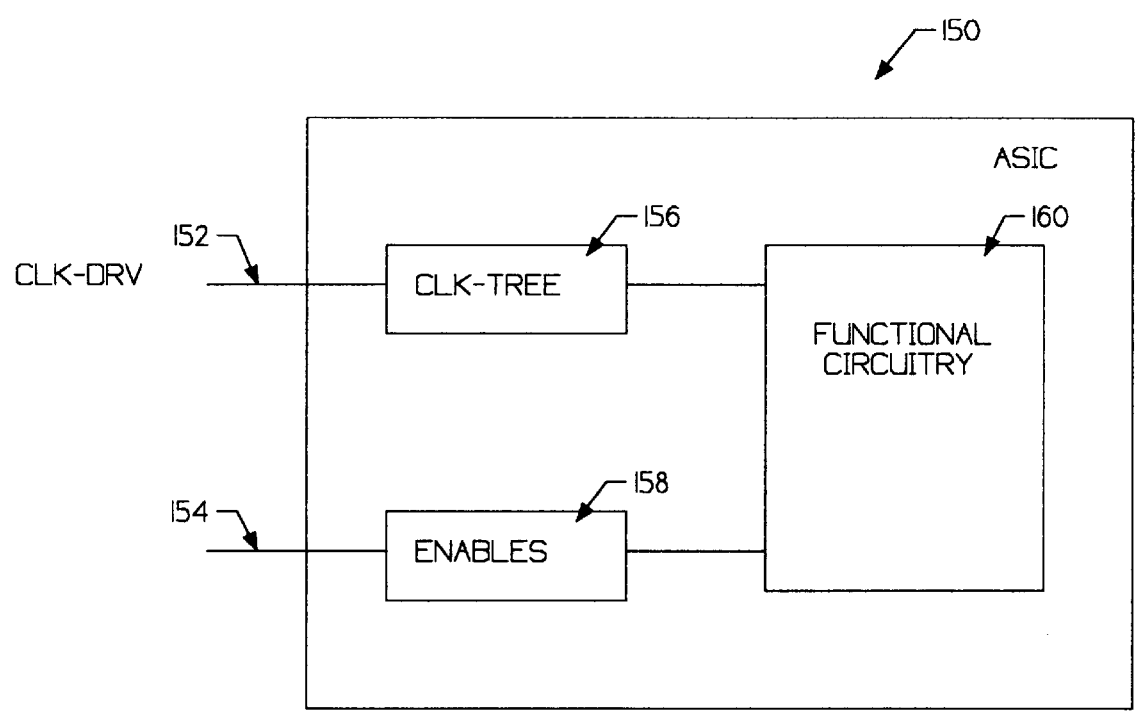
FIG. 6A is a schematic diagram showing an exemplary clock tree that uses clock enable signals to generate a different one of a number of clocks.
Figure 6B:
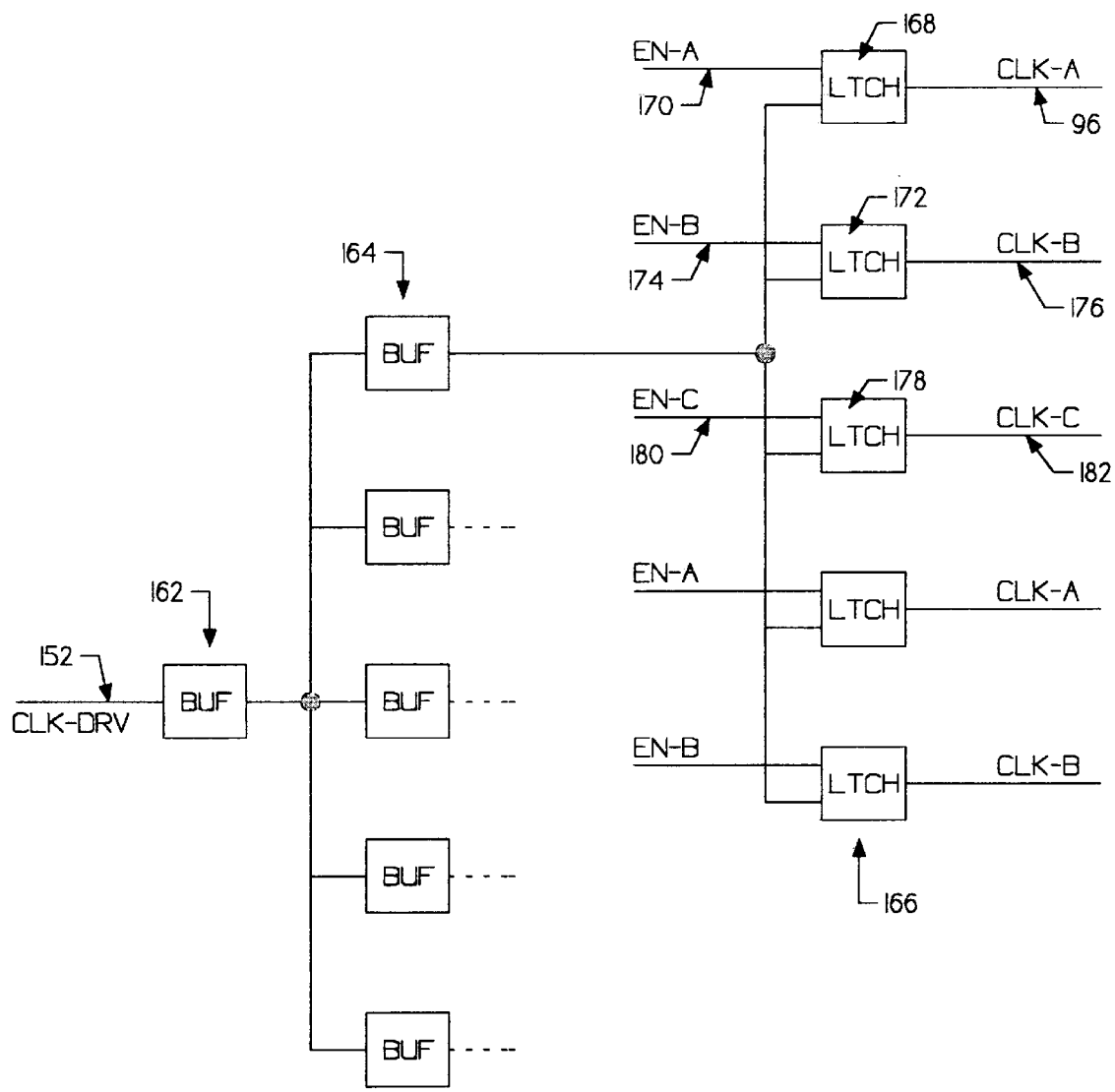
FIG. 6B is a schematic diagram showing an illustrative clock tree of FIG. 6A.

FIG. 6 is a schematic diagram showing and exemplary clock tree that uses a number of clock enable signals to generate a number of clock signals. As indicated above, a difficulty with the embodiment shown in FIG. 5 is that a separate clock tree must be provided for each clock signal. The clock trees may consume a relatively large area and may be difficult to route and correctly time. Clock skew, for example, may be difficult to manage, particularly when the clock trees are automatically placed and routed. This is true both at the ASIC level, and at the board and system level. Thus, a circuit designer may be forced to place and route the logic within the clock trees by hand, or may be forced to give the clock tree logic a high priority if place and routed by an automatic place and route tool.

An alternative clocking scheme is shown in FIG. 6. In this clocking scheme, the three clock signals 112, 114 and 116 of FIG. 5 are replaced by a single clock signal 152, and a number of enable signals 154. The clock signal 152 is provided to a clock tree 156, as shown. However, the clock signal is eventually provided to a number of latch cells. Each of the latch cells is enabled by an enable signal. For example, latch 168 is enabled by an EN-A signal 170. Similarly, the latch 172 is enabled by an EN-B signal 174. The enable signals control which of the clock signals is provided by the corresponding latch cell. For example, Latch 168 provides a CLK-A signal 96, and latch 172 provides a CLK-B signal 176. Thus, in this implementation, the latch cells generate the various clock signals required by the functional circuitry 160, and thus only a single clock tree 156 is required to generate the number of different clock signals.

The enable signals 154 generally run at a lower frequency than the raw clock signals. Thus, the timing of the enable signals is not as critical, and therefore, may not require the same degree of attention by a circuit designer. Further, since only a single clock tree is required to generate the number of clock signals, the overhead required by this implementation may be less than that shown in FIG. 5.

Figure 7A:
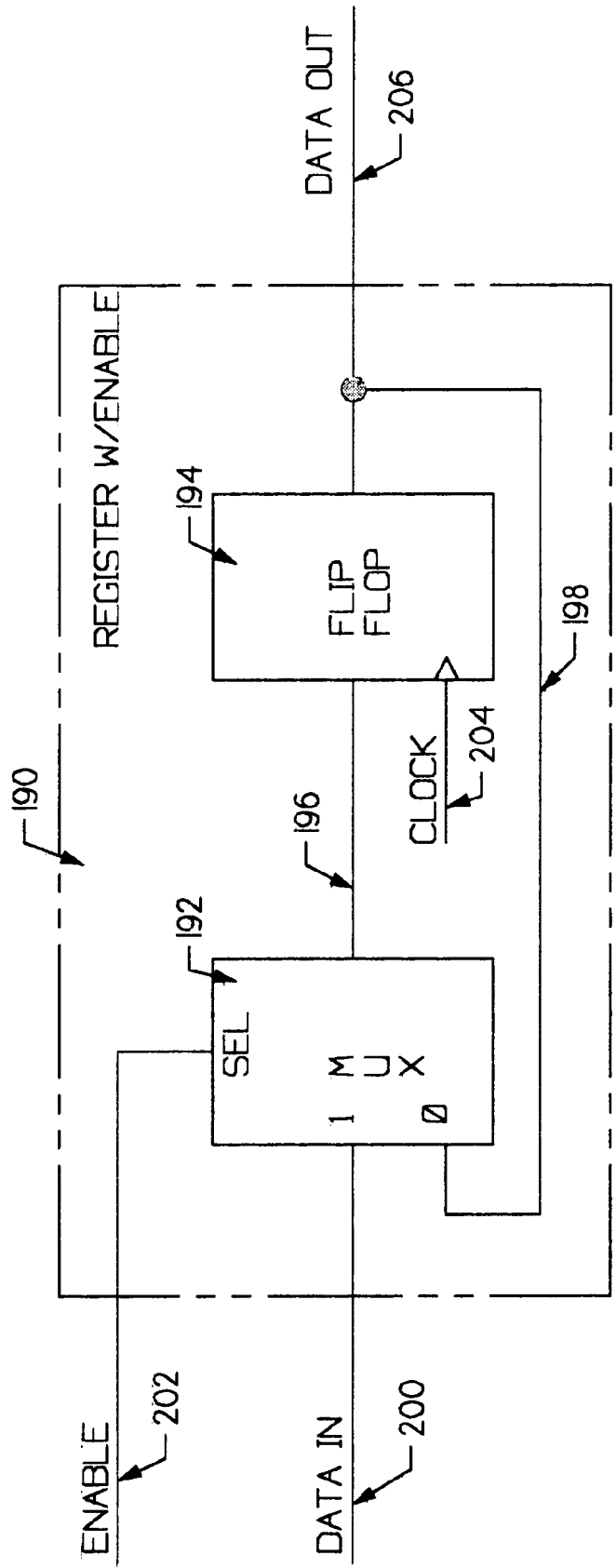
FIG. 7A is a block diagram that illustrates the combination of a multiplexer and a flip-flop to generate a gated clock design.
Figure 7B:
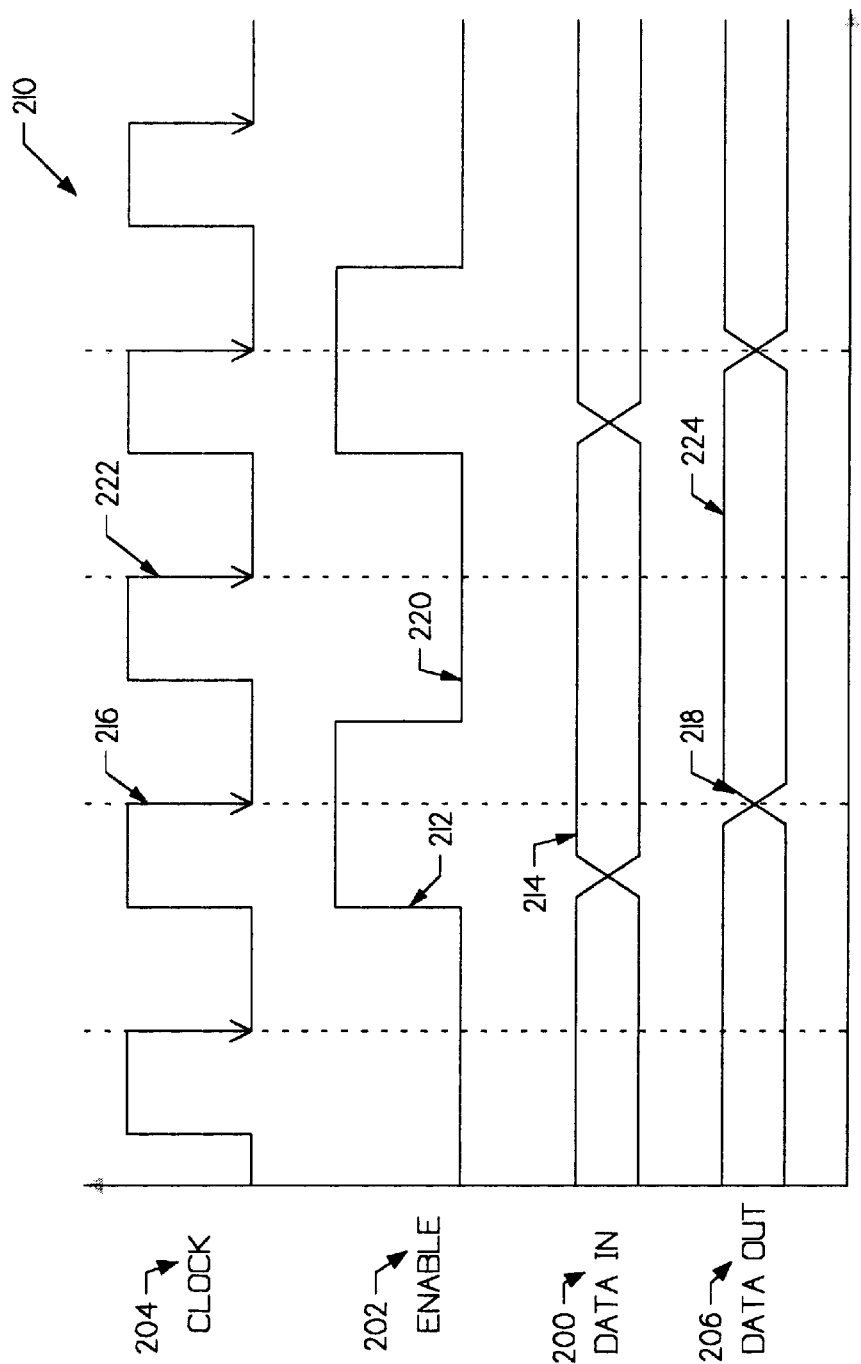
FIG. 7B is a timing diagram for the circuit shown in FIG. 7A.

FIG. 7 is a block diagram that illustrates the combination of a multiplexer and a flip-flop to generate a gated clock design. In this implementation, a latch with enable may be formed by combining a multiplexer 192 with a flip-flop 194. The multiplexer 192 may receive a data-in signal 200 on a first input, and may receive the output of the flip-flop 194 on a second input. The multiplexer 192 may be controlled by an enable signal 202, as shown. The output of the multiplexer may be provided to flip-flop 194 via interface 196. The flip-flop 194 is clocked by a raw clock 204 as shown. In this configuration, the data stored in flip-flop 194 is held until the enable signal 202 allows new data to be clocked through the multiplexer 192 and into flip-flop 194.

This is illustrated in the timing diagram shown generally at 210. Flip-flop 194 is a negative edge triggered flip-flop. That is, flip-flop 194 clocks in new data during each high-to-low transition of raw clock 204. In the illustrative diagram, the enable signal 202 is only asserted every other clock pulse and is generally centered about a high-low transition of the raw clock 204. For example, the enable signal 202 is asserted as shown at 212 before the high-to-low transition 216 of the raw clock 204, and un-asserted after the high-to-low transition 216 of raw clock 204, as shown. Accordingly, at the high-to-low transition 216 of clock 204, the data-in signal 200 is clocked into flip-flop 194, as shown at 218.

During the next high-to-low transition 222 of raw clock 204, however, enable signal 202 remains un-asserted as shown at 220. This prevents the data-in signal 200 from passing through multiplexer 192 and to the inputs of flip-flop 194. Rather, the current data stored in flip-flop 194 is passed through multiplexer 192 and to the inputs of flip-flop 194. Thus, the data that is stored just prior to the high-to-low transition 222 of raw clock 204 is clocked back into flip-flop 194 at the high-to-low transition 222. Thus, data-out 206 does not change at high-to-low transition 222 of raw clock 204, as shown at 224.

In view of the above, it is clear that a multiplexer and flip-flop may be combined to construct a memory element that operates in accordance with a gated clocking scheme. The enable signal 202 may be used to control which of the number of raw clock cycles actually latch in new data. A limitation of the above implementation is that the multiplexer 192 adds another level of gating between registers. That is, the propagation of data-in 200 through multiplexer 192 consumes a portion of the corresponding clock period. This may substantially reduce the overall performance of the system. Further, providing a multiplexer at the input of each register bit may require a substantial overhead in hardware.

Figure 8A:
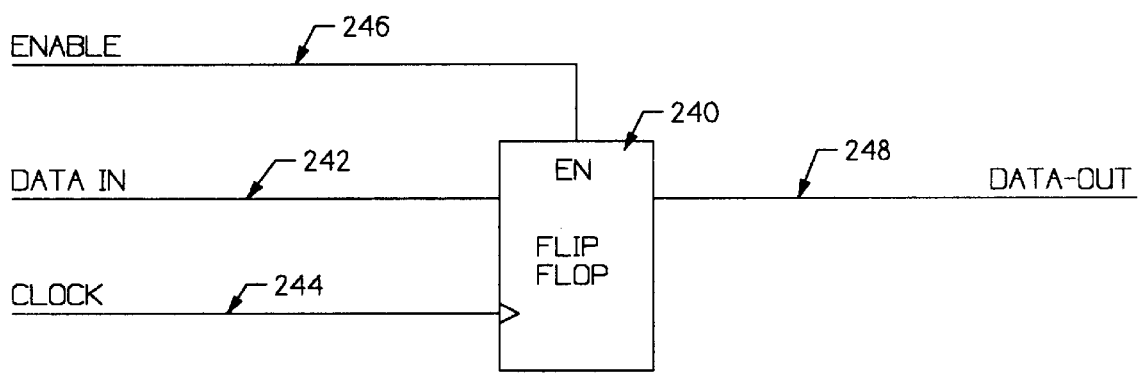
FIG. 8A is a block diagram that illustrates the use of a flip-flop with enable to generating a gated clock design.

FIG. 8 is a block diagram that illustrates the use of a flip-flop with enable to generate a gated clock design. The flip-flop with enable is shown at 240 and includes an enable signal 246, a data-in signal 242, and a clock signal 244. In the illustrative diagram, the flip-flop 240 is assumed to be a negative edge trigger flip-flop. Accordingly, flip-flop 240 only latches new data at a falling edge of the clock 244, and when the flip-flop 240 is enabled by enable signal 246.

Referring to the timing diagram generally shown at 249, a first falling edge 254 of clock 244 occurs while the enable signal 246 is high as shown at 252. Thus, the data present on data-in 242 is latched into flip-flop 240 at the falling edge 254 of clock 244, as shown at 256. However, during the second falling edge 260 of clock 244, the enable signal 246 is low as shown at 258. Thus, the data present on data-in 242 is not latched into flip-flop 240, as shown at 262. Thus, the enable signal 246 controls which clock pulses are active.

Many cell libraries may have a flip-flop with enable component. Thus, the corresponding timing model may be written for the flip-flop with enable component, any may not attempt to model the internal implementation of the component.

FIG. 9 is a schematic diagram showing a typical model for a latch with enable, and that the model encompasses the gated clock thereby avoiding the timing difficulty associated therewith. The latch with enable block is shown at 280 and has an enable input 282, a data input 284, and a clock input 286. The latch with enable block 280 is typically implemented using a standard latch element 290 and a gate 292. The gate 292 is typically an AND gate and may receive the enable signal 282 and the clock signal 286, as shown. In this configuration, both the enable signal 282 and the clock signal 286 must be asserted before a "GATED" clock 294 is asserted, and provided to latch 290.

As with the flip-flop with enable component shown and described with reference to FIG. 8, many component libraries may include a latch with enable component. Thus, although implemented in a manner similar to that shown at 280, functional and timing models for the latch with enable component are generally provided at the component level. Thus, any timing difficulties associated with gate 292 are avoided. A limitation of this approach, however, is that each latch 290 must include a gate 292. This may require a substantial overhead in both real estate and power, as described herein.

Figure 10A:
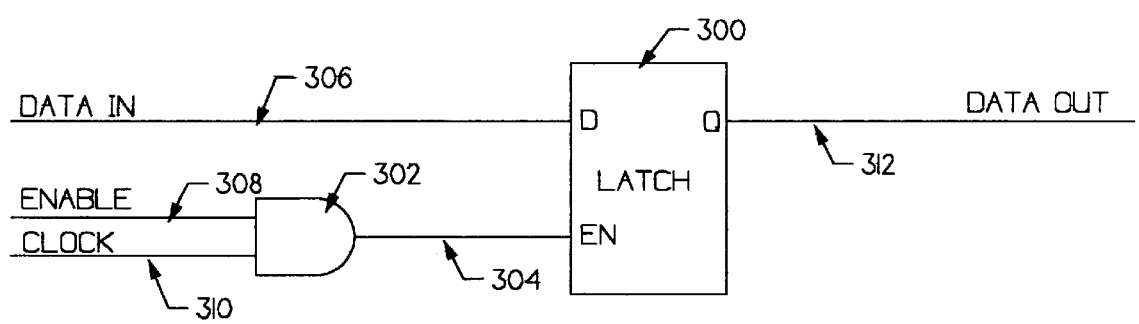
FIG. 10A illustrates a latch having a gated clock and the critical timing parameters therefor.
Figure 10B:
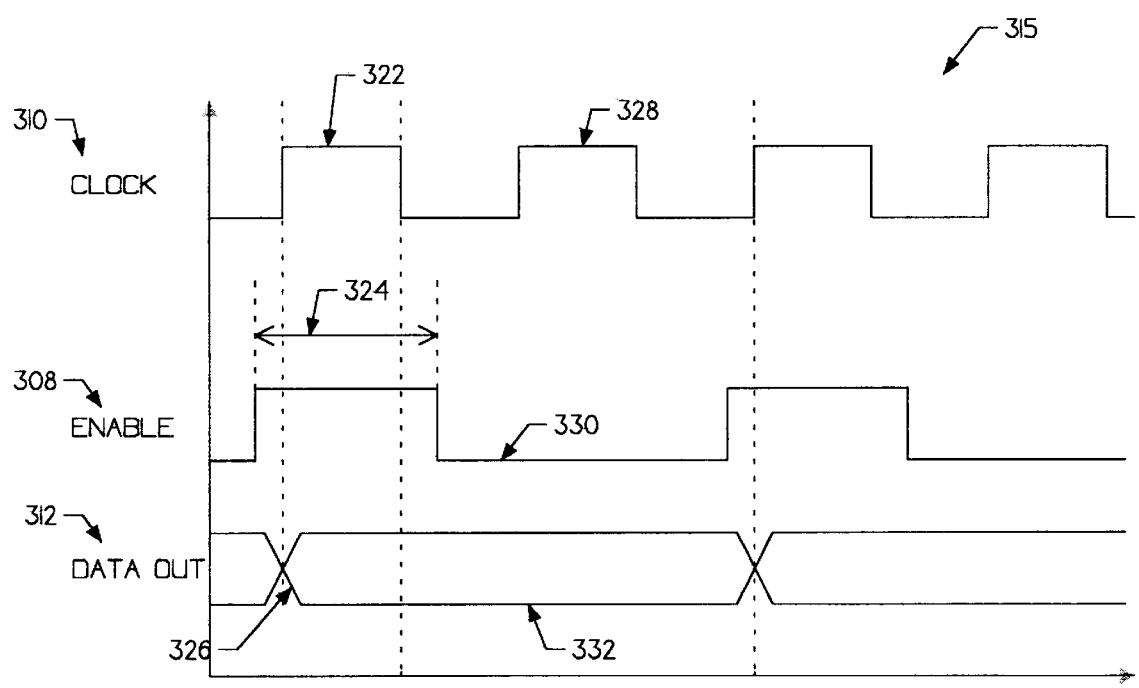
FIG. 10B is a timing diagram for the circuit shown in FIG. 10A.

FIG. 10 illustrates a latch having a separate gated clock, and the critical timing parameters associated therewith. A better approach to modeling a memory element with an enable may be to separately model the memory element (latch or flip-flop) and the gated clock portion (or enable). In this configuration, and as shown in FIG. 11, a single gate element 302 may be provided for a number of latch elements 300, thereby reducing the overhead associated with a gated clocking scheme.

Referring to the timing diagram generally shown at 315, it may be important that the enable signal 308 bridge the entire clock pulse to prevent a shortened clock period or clock glitches at the latch elements 300. In the illustrative diagram, the clock signal 310 has a clock pulse shown at 322. The enable signal 308 may have a corresponding pulse 320 which should overlap the clock pulse 322 as shown. Since the enable signal 308 typically operates at a lower frequency than the raw clock signal 310, the enable signal 308 may not be subject to the same timing constraints as the raw clock signal.

Figure 11:
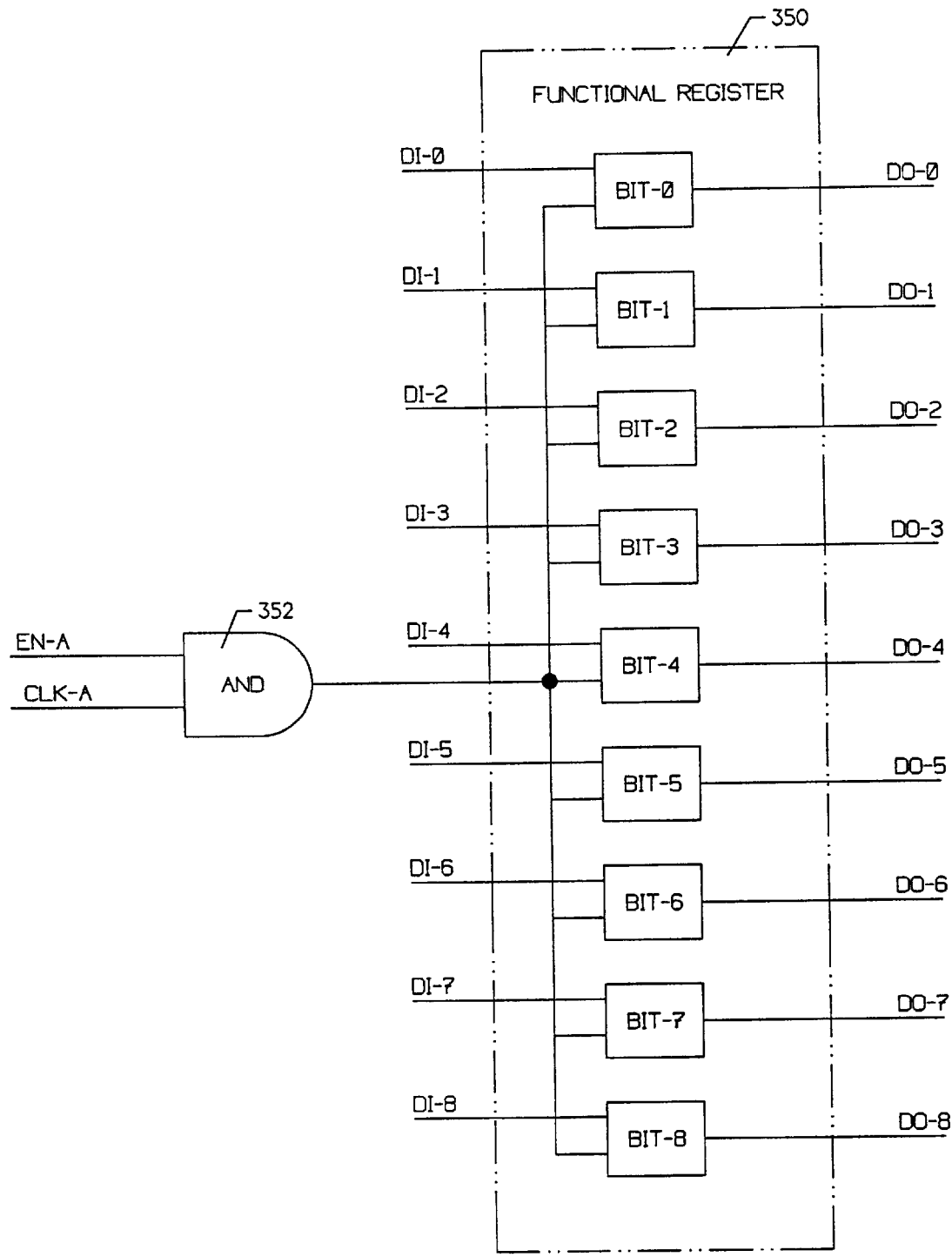
FIG. 11 is a schematic diagram illustrating the benefit of providing a separate gated clock to a number of register bits.

FIG. 11 is a schematic diagram illustrating the benefit of providing a separate gated clock to a number of registered bits. As indicated with reference to FIG. 10, it may be desirable to separately model the memory element (latch or flip-flop) from the gated clock portion (or enable). That is, a separate gate 352 may be provided and modeled as such. In this configuration, a single gate element 352 may be provided for a number of latch elements 350, thereby reducing the overhead associated with a gated clocking scheme.

Figure 12A:
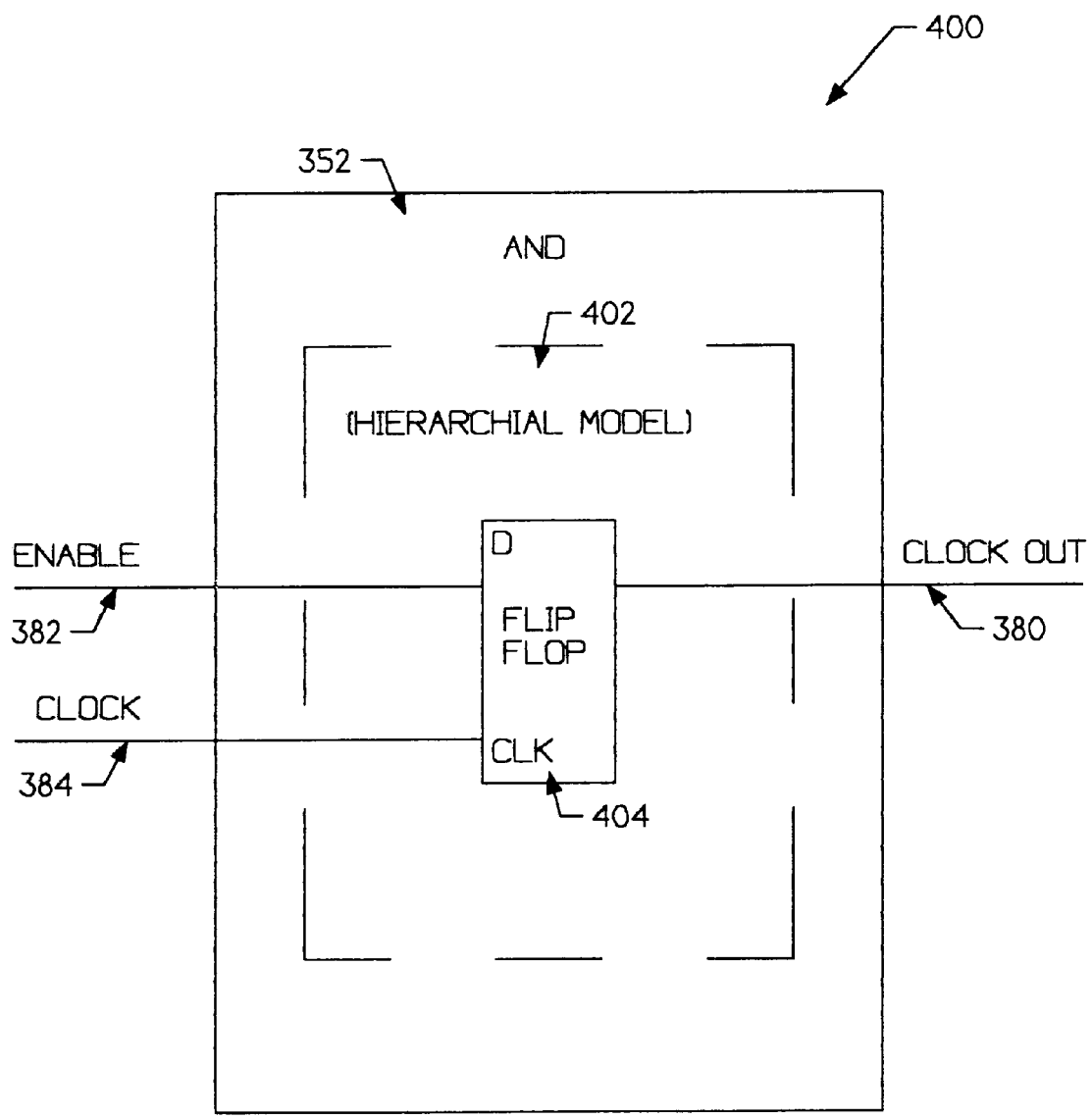
FIG. 12A is a block diagram illustrating an exemplary model for the AND gate of FIG. 10 and FIG. 11 in accordance with the present invention.
Figure 12B:
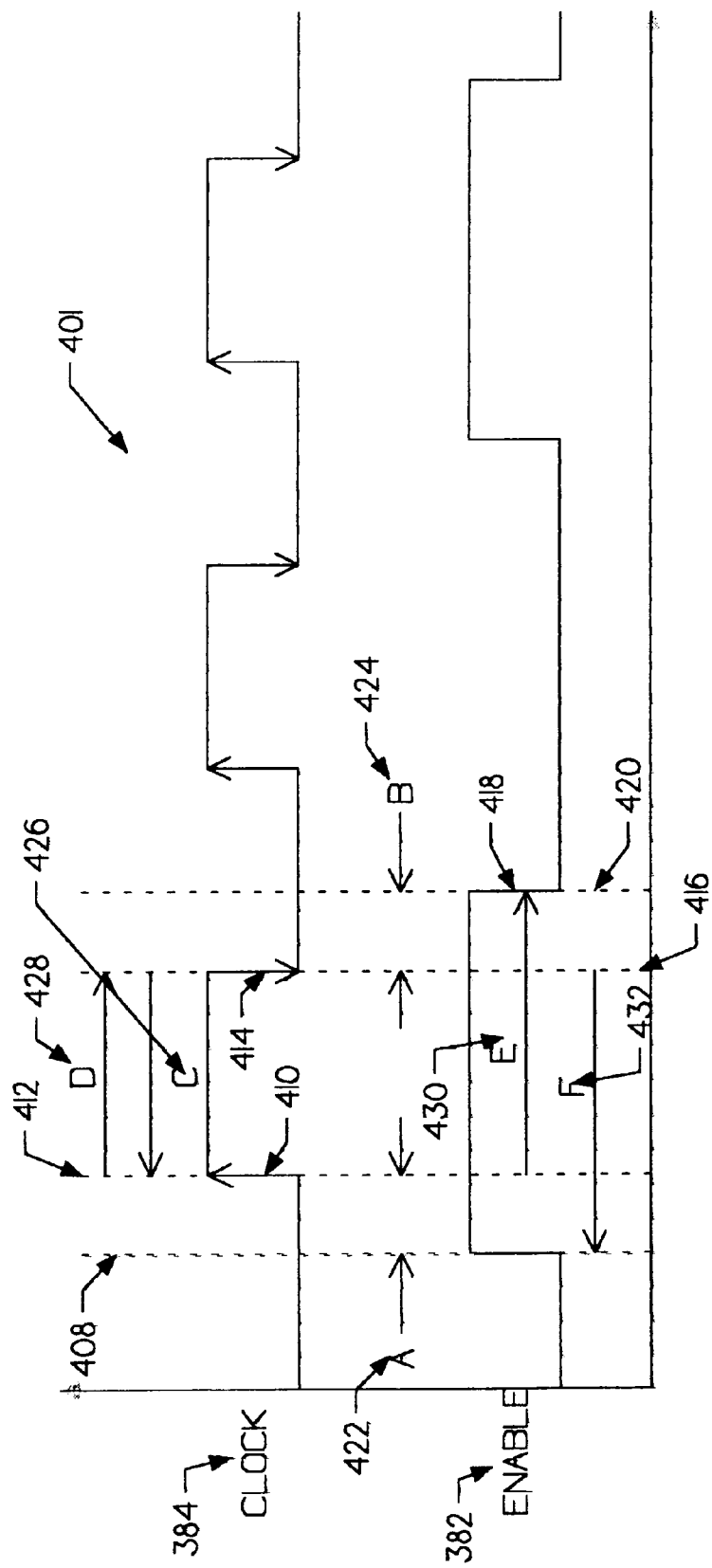
FIG. 12B is a timing diagram for the circuit shown in FIG. 12A.

FIG. 12 is a block diagram illustrating an exemplary model for the AND gate of FIGS. 10 and 11 in accordance with the present invention. As indicated above, typical logic optimizer tools can only handle standard clocking schemes, such as where each register or latch in a design receives a clock signal from a clock source. For high performance designs, however, it is often desirable to use gated clocking schemes to increase the performance of the design. For example, it has been found that a gated clocking scheme can increase the performance of a design by as much as 10 to 30 percent over a design that uses standard clocking schemes.

In a gated clocking scheme, both a clock enable signal 382 and a clock signal 384 may be provided to a logic gate 352, wherein the output of the logic gate 352 may provide a "gated clock signal" 380 to corresponding storage elements. For the proper operation of the design, however, the clock enable signal 382 must arrive at the logic gate 352 within a predetermined time relative to the clock signal 384. Otherwise, the gated clock signal 380 may not have the expected clock pulse width or may be susceptible to clock glitching that may upset the desired state of the system.

Standard optimization tools typically do not have the capability of checking the relative timing of signals arriving at a logic gate. Rather, standard optimization tools typically only have the capability to check the relative timing between signals that arrive at a storage element, such as a register, by using predetermined setup and hold times that are defined for the storage element.

In accordance with the present invention, the logic gate 352 may be modeled as a storage element 404. Thus, a standard optimization tool may be used to correctly optimize the resulting design. Since the standard optimization tool can check the relative timing between signals that arrive at a storage element, the standard optimizer tool may properly check the relative timing between the signals arriving at the logic gate 352.

Referring to the timing diagram generally shown at 401, the clock signal 384 may have a clock pulse with a rising edge as shown at 410, and a falling edge as shown at 414. The enable signal 382 may have a pulse with a rising edge at 406 and a falling edge at 418. As indicated above, it is desirable for the enable signal 382 to fully overlap the clock signal 384 as shown. Referring to FIGS. 12 and 13, the hierarchial model 402 may include a number of timing parameters which enable the standard optimizer tool to properly optimize the enable signal 382 and the clock signal 384.

In a first illustrative embodiment, the hierarchial model 402 may include a setup time and a hold time. The setup time is shown at 422 and represents the time between the rising edge 406 of the enable pulse and the rising edge 410 of the clock pulse. That is, the setup parameter is determined relative to the low-to-high clock edge 410 of the clock pulse. The hold parameter may be defined by the desired overlap between the falling edge 414 of the clock pulse and the falling edge 418 of the enable pulse. That is, the hold parameter may be defined as a typical hold time from the high-to-low transition 414 of the clock pulse. These setup and hold time parameters are shown at 452 of FIG. 13 below.

It is also contemplated that, to ensure that the enable pulse remains constant during the entire clock pulse, an additional setup or hold time be defined. The additional setup parameter 426 may be defined as a typical setup time extending for the entire clock pulse width prior to the high-to-low transition 414 of the clock pulse. Alternatively, a hold parameter 428 may be defined as a typical hold time from the low-to-high transition 410 of the clock pulse and may extend for the entire clock pulse width. Using these parameters, a standard optimization tool may be used to check that the enable pulse bridges the entire clock pulse, and is stable therebetween. These setup and hold time parameters are shown at 462 of FIG. 13 below.

In a second illustrative embodiment, a setup parameter and a hold parameter may be defined relative to the low-to-high transition 410 of the clock pulse. The setup parameter 422 may be assigned a value corresponding to the desired overlap. The hold parameter may be assigned a value corresponding to the desired overlap plus the clock pulse width. These setup and hold time parameters are shown at 466 of FIG. 13 below.

Alternatively, a setup and hold parameter may be defined relative to the high-to-low transition 414 of the clock pulse. The hold parameter 424 may be assigned a value corresponding to the desired overlap. The setup parameter 432 may be assigned a value corresponding to the desired overlap plus the clock pulse width. These setup and hold time parameters are shown at 468 of FIG. 13 below. In either case, a standard optimization tool may properly check the relative timing between the enable signal 382 and the clock signal 384.

Figure 14:
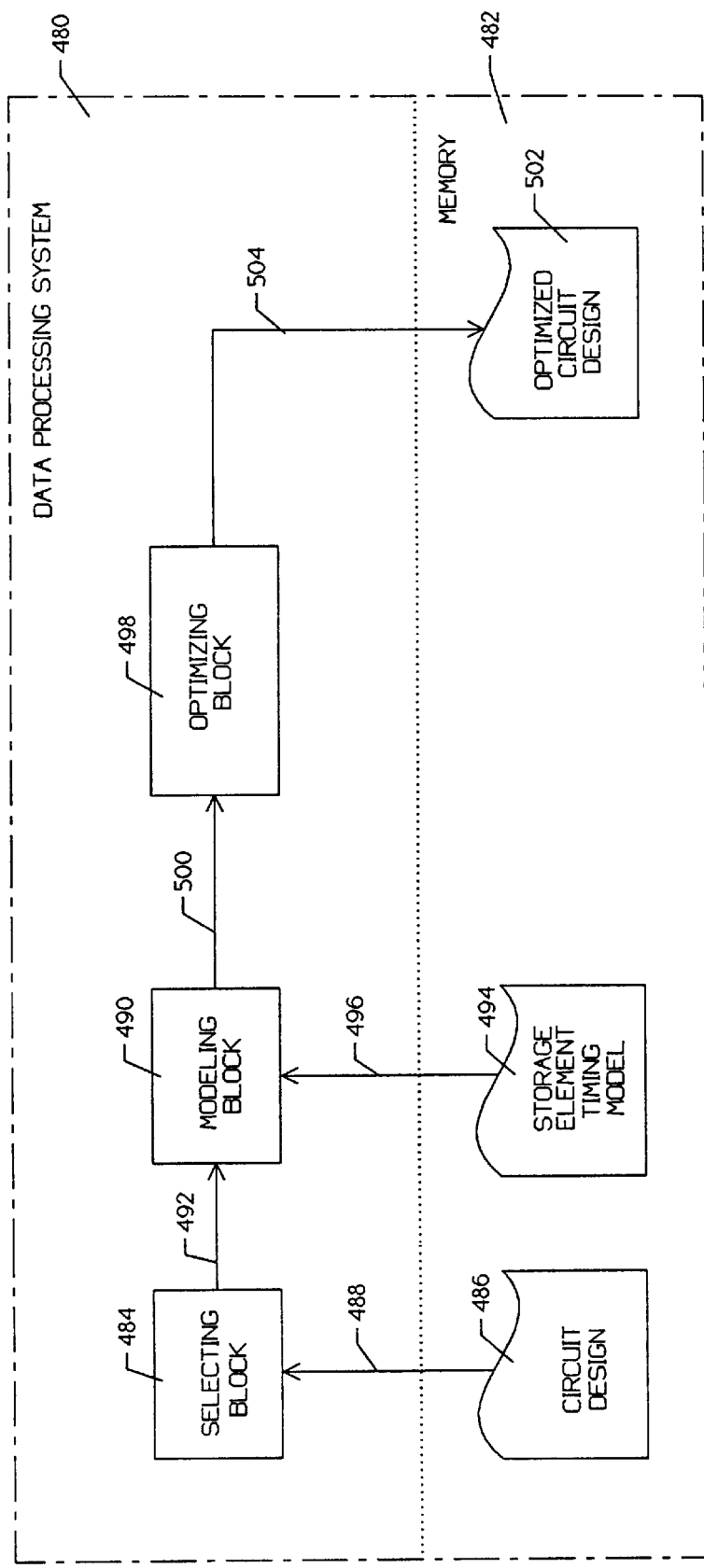
FIG. 14 is a block diagram of a first exemplary data processing system in accordance with the present invention.

FIG. 14 is a block diagram of a first illustrative data processing system in accordance with the present invention. The data processing system is shown at 480 and includes a memory portion 482. A selecting block 484 may read the circuit design database 486 from the memory portion 482 via interface 488. The selecting block 484 may select the gates within the design that provide the gated clock signals. The selected gates may be identified and the design may be provided to modeling block 490 via interface 492. Modeling block 490 may model the selected gates as storage elements, as described above. Modeling block 490 may then read a corresponding storage element timing model 494 from the memory portion 482 via interface 496.

The result may be provided to optimizing block 498 via interface 500. Optimizing block 498 may optimize the design using the storage element timing model 494 for the selected gates. Optimizing block 498 may then provides an optimized circuit design 502 to the memory portion 482 via interface 504.

Figure 15:
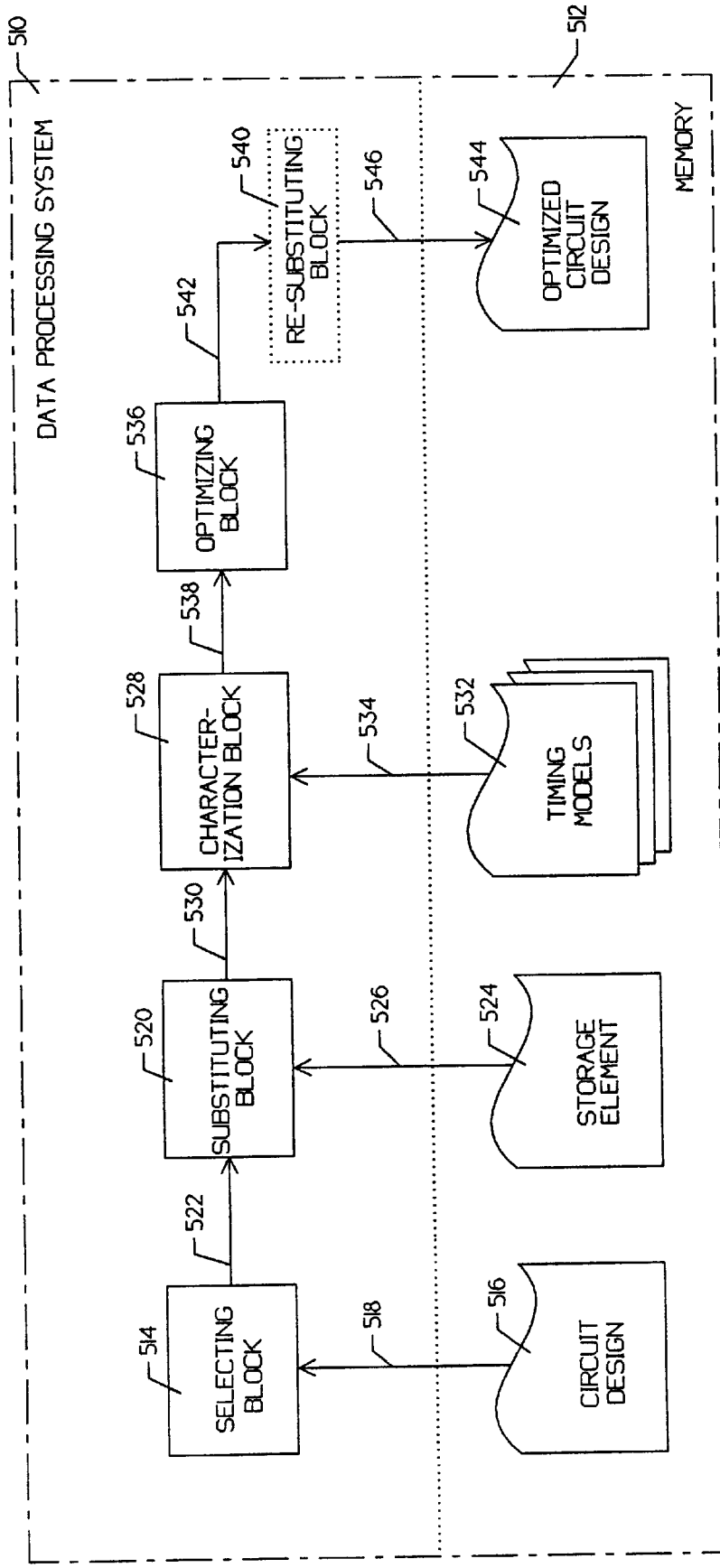
FIG. 15 is a block diagram of a second exemplary data processing system in accordance with the present invention.

FIG. 15 is a block diagram of a second exemplary data processing system in accordance with the present invention. The data processing system is shown at 510 and may include a memory portion 512. A selecting block 514 may read the circuit design database 516 from the memory portion 512 via interface 518. The selecting block 514 may select the gates within the design that provide the gated clock signals. The selected gates may be identified and the design may be provided to substituting block 520. Substituting block may substitute each of the selected gates with a storage element 524. The result may be provided to characterization block 528. Characterization block 528 may read timing models 532, and may subsequently perform a timing analysis of the design. Characterization block 528 may then assign timing constraints to selected portions of the design. For example, for those portions of the design that are to be optimized for timing, the characterization block 528 may identify critical paths within the design that need to be improved by optimization. The characterization block 528 may thus assign timing constraints to those portions of the design, indicating the degree that they must be optimized to meet the desired timing goals.

The result may be provided to optimizing block 498 via interface 500. Optimizing block 498 may optimize the design using the storage element timing model 494 for the selected gates. The optimization block 536 may attempt to optimize the design such that all of the timing constraints assigned by the characterization block 528 are satisfied. In accordance therewith, the optimization block 536 may, for example, remove redundant logic, increase the power of selected cells to improve performance, etc.

The optimized design is then provided to a substituting block 540. Substituting block 540 is optional as indicated by the dotted box, and may substitute the selected storage elements with the corresponding gates to re-construct the gated clock structures. The resulting optimized design may be written to an optimized circuit design file, as shown at 544.

Figure 16:
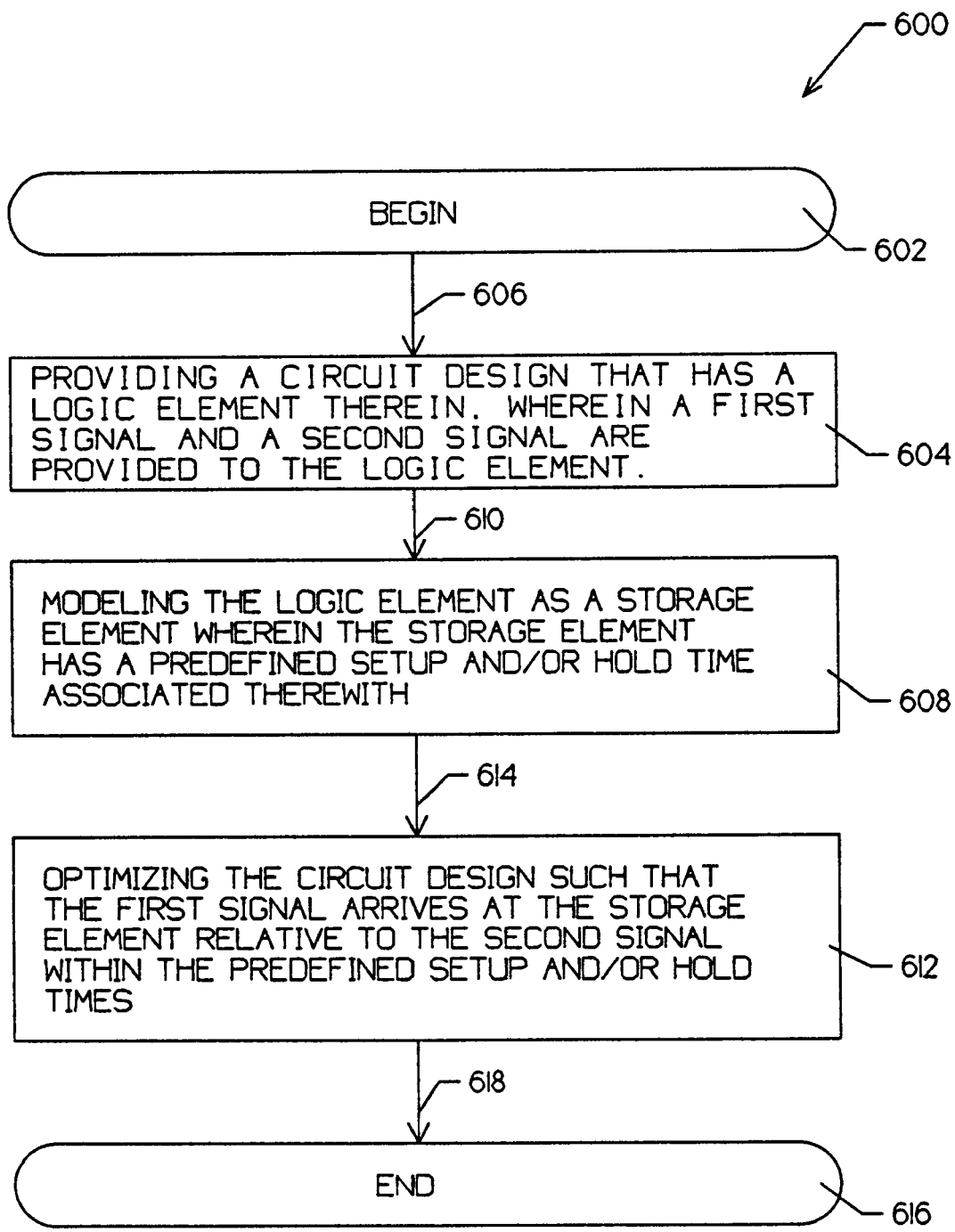
FIG. 16 is a flow diagram showing a first exemplary method of the present invention.

FIG. 16 is a flow diagram showing a first exemplary method of the present invention. The algorithm is generally shown at 600 and is entered at element 602. Control is then passed to element 604 via interface 606. Element 604 provides a circuit design that has a logic element therein, wherein a first signal and a second signal are provided to the logic element. Control is then passed to element 608 via interface 610. Element 608 models the logic element as a storage element, wherein the storage element has a predefined setup and/or hold time associated therewith. Control is then passed to element 612 via interface 614. Element 612 optimizes the circuit design such that the first signal arrives at the storage element relative to the second signal, within the predefined setup and/or hold times. Control is then passed to element 616 via interface 618, wherein the algorithm is exited.

Figure 17:
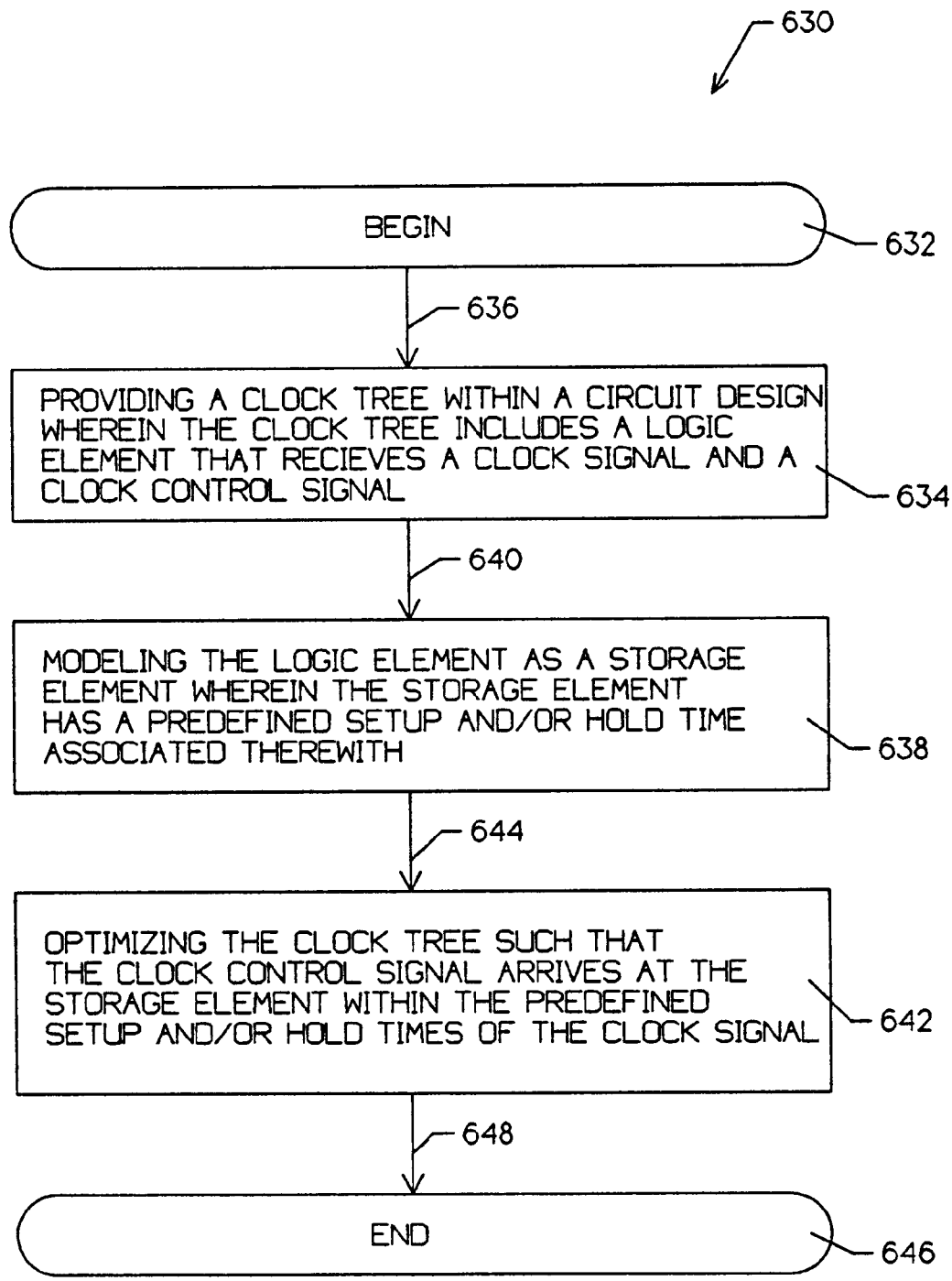
FIG. 17 is a flow diagram showing a second exemplary method of the present invention.

FIG. 17 is a flow diagram showing a second exemplary method of the present invention. The algorithm is generally shown at 630, and is entered at element 632. Control is then passed to element 634 via interface 636. Element 634 provides a clock tree within a circuit design, wherein the clock tree includes a logic element that receives a clock signal and a clock control signal. Control is then passed to element 638 via interface 640. Element 638 models the logic element as a storage element, wherein the storage element has a predefined setup and/or hold time associated therewith. Control is then passed to element 642 via interface 644. Element 642 optimizes the clock tree such that the clock control signal arrives at the storage element within the predefined setup and/or hold time of the clock signal. Control is then passed to element 646 via interface 648, wherein the algorithm is exited.

Figure 18:
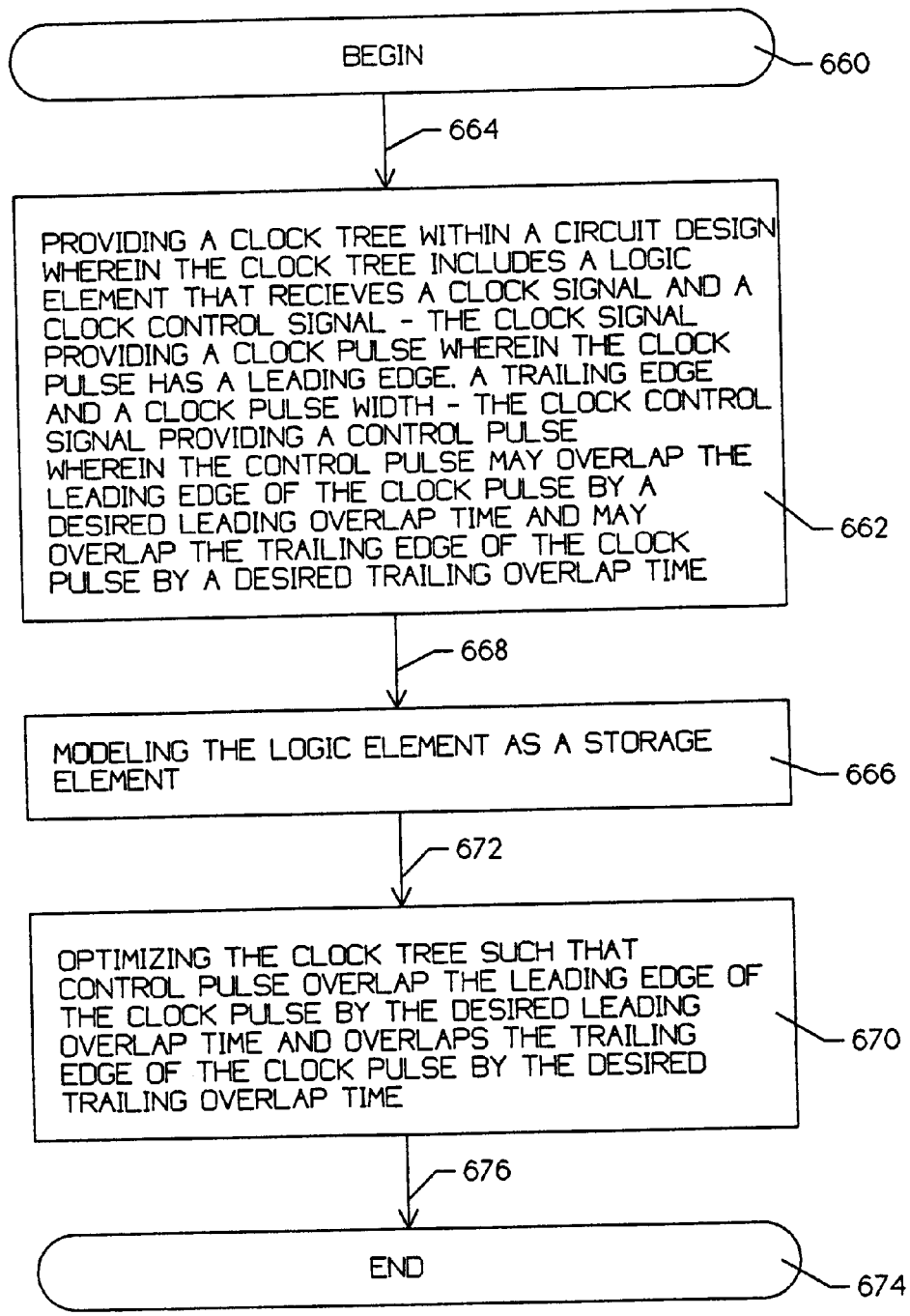
FIG. 18 is a flow diagram showing a third exemplary method of the present invention.

FIG. 18 is a flow diagram showing a third exemplary method of the present invention. The algorithm is entered at element 660, wherein control is passed to element 662 via interface 664. Element 662 provides a clock tree within a circuit design, wherein the clock tree includes a logic element that receives a clock signal and a clock control signal. The clock signal provides a clock pulse, wherein the clock pulse is a leading edge, a trailing edge and a clock pulse width. The clock control signal provides a control pulse, wherein the control pulse may overlap the leading edge of the clock pulse by a desired reading overlap time and may overlap the trailing edge of the clock pulse by a desired trailing overlap time. Control is then passed to element 666 via interface 668. Element 666 models the logic element as a storage element. Control is then passed to element 670 via interface 672. Element 670 optimizes the clock tree such that the control pulse overlaps the leading edge of the clock pulse by the desired leading overlap time and overlaps the trailing edge of the clock pulse by the desired trailing overlap time. Control is then passed to element 674 via interface 676, wherein the algorithm is exited.

Figure 19:
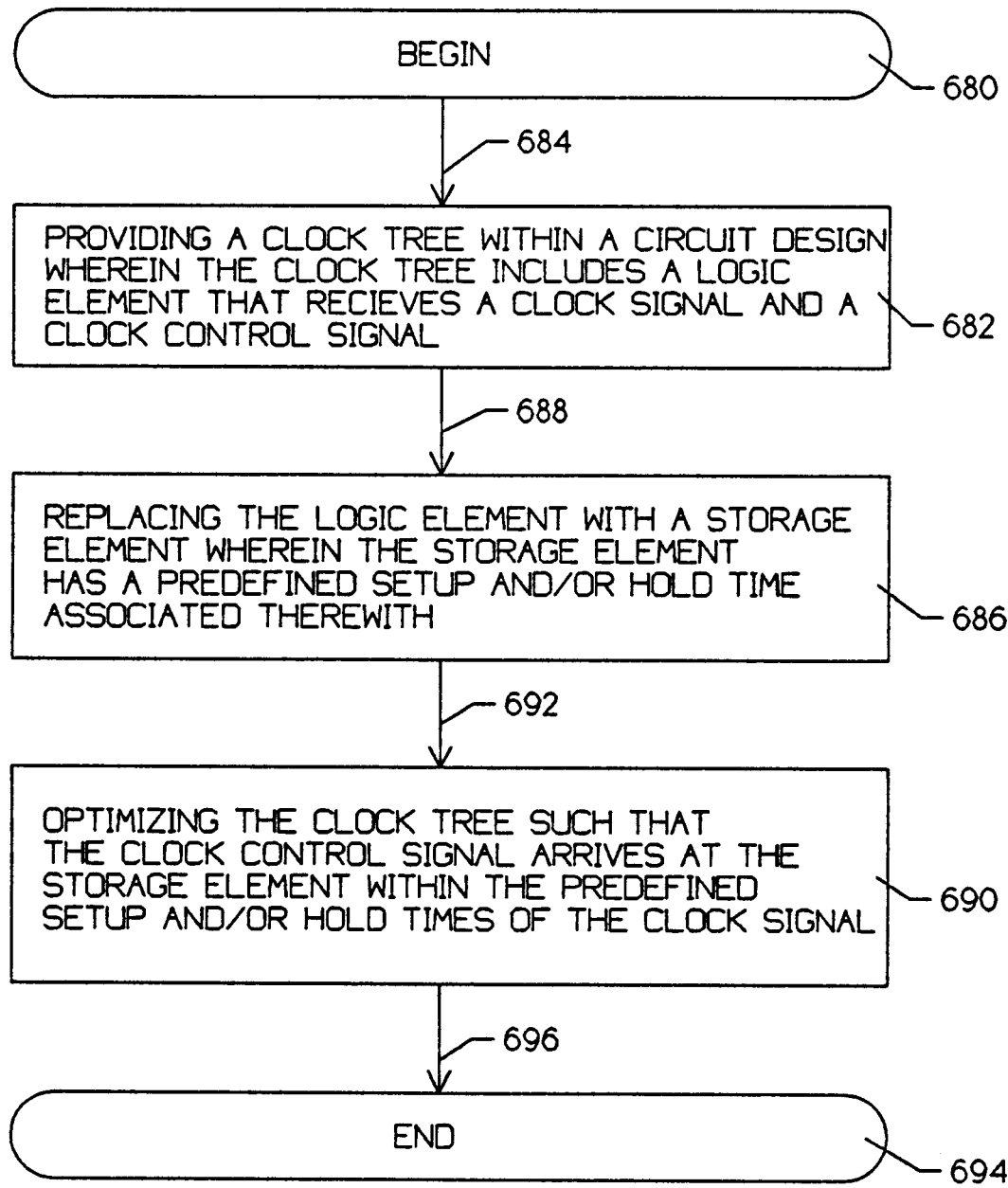
FIG. 19 is a flow diagram showing a fourth exemplary method of the present invention.

FIG. 19 is a flow diagram showing a fourth exemplary method of the present invention. The algorithm is entered at element 680, wherein control is passed to element 682 via interface 684. Element 682 provides a clock tree within a circuit design, wherein the clock tree includes a logic element that receives a clock signal and a clock control signal. Control is then passed to element 686 via interface 688. Element 686 replaces the logic element with a storage element, wherein the storage element has a predefined setup and/or hold time associated therewith. Control is then passed to element 690 via interface 692. Element 690 optimizes the clock tree such that the clock control signal arrives at the storage element within the predefined setup and/or hold times of the clock signal. Control is then passed to element 694 via interface 696, wherein the algorithm is exited.

Having thus described the preferred embodiments of the present invention, those of skill in the art will readily appreciate that the teachings found herein may be applied to yet other embodiments within the scope of the claims hereto attached.

What is claimed is:

1. A method for optimizing a circuit design having a logic element such that a first signal and a second signal arrive at the logic element within a predetermined time of one another, the method comprising the steps of:
   a. modeling the logic element as a storage element, wherein the storage element has a predefined setup time associated therewith; and
   b. optimizing the circuit design using an optimization tool, wherein the optimization tool optimizes the circuit design such that the first signal arrives at the storage element relative to the second signal within the predefined setup time.

2. A method for optimizing a circuit design having a logic element such that a first signal and a second signal arrive at the logic element within a predetermined time of one another, the method comprising the steps of:
   a. modeling the logic element as a storage element, wherein the storage element has a predefined hold time associated therewith; and
   b. optimizing the circuit design using an optimization tool, wherein the optimization tool optimizes the circuit design such that the first signal arrives at the storage element relative to the second signal within the predefined hold time.

3. A method for optimizing a circuit design having a logic element such that a first signal and a second signal arrive at the logic element within a predetermined time of one another, the method comprising the steps of:
   a. modeling the logic element as a storage element, wherein the storage element has a predefined setup and hold time associated therewith; and
   b. optimizing the circuit design using an optimization tool, wherein the optimization tool optimizes the circuit design such that the first signal arrives at the storage element relative to the second signal within the predefined setup and hold times.

4. A method for optimizing a clock tree within a circuit design using an optimization tool, wherein the clock tree includes a logic element that receives a clock signal and a clock control signal, the method comprising the steps of:
   a. modeling the logic element as a storage element, wherein the storage element has a predefined setup time associated therewith; and
   b. optimizing the clock tree using the optimization tool, wherein the optimization tool optimizes the clock tree such that the clock control signal arrives at the storage element within the predefined setup time of the clock signal.

5. A method for optimizing a clock tree within a circuit design using an optimization tool, wherein the clock tree includes a logic element that receives a clock signal and a clock control signal, the method comprising the steps of:
   a. modeling the logic element as a storage element, wherein the storage element has a predefined hold time associated therewith; and
   b. optimizing the clock tree using the optimization tool, wherein the optimization tool optimizes the clock tree such that the clock control signal arrives at the storage element within the predefined hold time of the clock signal.

6. A method for optimizing a clock tree within a circuit design using an optimization tool, wherein the clock tree includes a logic element that receives a clock signal and a clock control signal, the method comprising the steps of:
   a. modeling the logic element as a storage element, wherein the storage element has a predefined setup and hold time associated therewith; and
   b. optimizing the clock tree using the optimization tool, wherein the optimization tool optimizes the clock tree such that the clock control signal arrives at the storage element within the predefined setup and hold times of the clock signal.

7. A method according to claim 6 wherein the storage element is a register.

8. A method according to claim 7 wherein said register has a data input and a clock input, and the clock signal is provided to the clock input and the clock control signal is provided to the data input.

9. A method for optimizing a clock tree within a circuit design using an optimization tool, wherein the clock tree includes a logic element that receives a clock signal and a clock control signal, the method comprising the steps of:
   a. replacing the logic element with a storage element; and
   b. optimizing the clock tree using the optimization tool, wherein the optimization tool optimizes the clock tree such that the clock control signal arrives at the storage element within a predetermined time of the clock signal.

10. A method according to claim 9 further comprising the step of:
    c. replacing the storage element with the logic element after the optimization step (b).

11. A method according to claim 10 wherein said optimization step (b) does not optimize the storage element itself.

12. A method for optimizing a clock tree within a circuit design using an optimization tool, wherein the clock tree includes a logic element that receives a clock signal and a clock control signal, the clock signal providing a clock pulse wherein the clock pulse has a leading edge, a trailing edge, and a clock pulse width, the clock control signal providing a control pulse wherein the control pulse may overlap the leading edge of the clock pulse by a desired leading overlap amount and may overlap the trailing edge of the clock pulse by a desired trailing overlap amount, the method comprising the steps of:
    a. modeling the logic element as a storage element; and
    b. optimizing the clock tree using the optimization tool, wherein the optimization tool optimizes the clock tree such that the control pulse overlaps the leading edge of the clock pulse by the desired leading overlap amount.

13. A method for optimizing a clock tree within a circuit design using an optimization tool, wherein the clock tree includes a logic element that receives a clock signal and a clock control signal, the clock signal providing a clock pulse wherein the clock pulse has a leading edge, a trailing edge, and a clock pulse width, the clock control signal providing a control pulse wherein the control pulse may overlap the leading edge of the clock pulse by a desired leading overlap amount and may overlap the trailing edge of the clock pulse by a desired trailing overlap amount, the method comprising the steps of:
    a. modeling the logic element as a storage element; and
    b. optimizing the clock tree using the optimization tool, wherein the optimization tool optimizes the clock tree such that the control pulse overlaps the trailing edge of the clock pulse by the desired trailing overlap amount.

14. A method for optimizing a clock tree within a circuit design using an optimization tool, wherein the clock tree includes a logic element that receives a clock signal and a clock control signal, the clock signal providing a clock pulse wherein the clock pulse has a leading edge, a trailing edge, and a clock pulse width, the clock control signal providing a control pulse wherein the control pulse may overlap the leading edge of the clock pulse by a desired leading overlap amount and may overlap the trailing edge of the clock pulse by a desired trailing overlap amount, the method comprising the steps of:

a. modeling the logic element as a storage element; and b. optimizing the clock tree using the optimization tool, wherein the optimization tool optimizes the clock tree such that the control pulse overlaps the leading edge of the clock pulse by the desired leading overlap amount and overlaps the trailing edge of the clock pulse by the desired trailing overlap amount.

15. Apparatus for,optimizing a circuit design having a logic element therein such that a first signal and a second signal arrive at the logic element within a predetermined time of one another, comprising:

a. modeling means for modeling the logic element as a storage element, wherein the storage element has a predetermined setup time associated therewith; and b. optimizing means coupled to said modeling means for optimizing the circuit design such that the first signal arrives at the storage element within the predetermined setup time of the second signal.

16. Apparatus for optimizing a circuit design having a logic element therein such that a first signal and a second signal arrive at the logic element within a predetermined time of one another, comprising:

a. modeling means for modeling the logic element as a storage element, wherein the storage element has a predetermined hold time associated therewith; and b. optimizing means coupled to said modeling means for optimizing the circuit design such that the first signal arrives at the storage element within the predetermined hold time of the second signal.

17. Apparatus for,optimizing a circuit design having a logic element therein such that a first signal and a second signal arrive at the logic element within a predetermined time of one another, comprising:

a. modeling means for modeling the logic element as a storage element, wherein the storage element has a predetermined setup and hold time associated therewith; and b. optimizing means coupled to said modeling means for optimizing the circuit design such that the first signal arrives at the storage element within the predetermined setup and hold times of the second signal.

18. Apparatus according to claim 17 wherein said logic element comprises a two-input gate.

19. Apparatus according to claim 18 wherein said modeling means comprises a timing model of a register bit having a clock and a data input, the clock input being coupled to a first one of the inputs of the two-input gate and the data input being coupled to the second one of the inputs of the two-input gate.

20. Apparatus according to claim 19 wherein said timing model defines the setup time and the hold time for the register bit.

21. Apparatus according to claim 20 wherein said optimizing means comprises an optimization tool.

22. Apparatus according to claim 21 wherein said optimization tool checks the setup time and the hold time of the register bit, thereby checking when the first signal arrives at the register bit relative to the second signal.

23. Apparatus for optimizing a circuit design having a logic element such that a first signal and a second signal arrive at the logic element within a predetermined time of one another, the method comprising the steps of:

a. substituting means for substituting the logic element with a storage element wherein the storage element has a predetermined setup time associated therewith; and b. optimizing means coupled to said substituting means for optimizing the circuit design such that the first signal arrives at the storage element within the predetermined setup time of the second signal.

24. Apparatus for optimizing a circuit design having a logic element such that a first signal and a second signal arrive at the logic element within a predetermined time of one another, the method comprising the steps of:

a. substituting means for substituting the logic element with a storage element wherein the storage element has a predetermined hold time associated therewith; and b. optimizing means coupled to said substituting means for optimizing the circuit design such that the first signal arrives at the storage element within the predetermined hold time of the second signal.

25. Apparatus for optimizing a circuit design having a logic element such that a first signal and a second signal arrive at the logic element within a predetermined time of one another, the method comprising the steps of:

a. substituting means for substituting the logic element with a storage element wherein the storage element has a predetermined setup and hold time associated therewith; and b. optimizing means coupled to said substituting means for optimizing the circuit design such that the first signal arrives at the storage element within the predetermined setup and hold times of the second signal.

26. Apparatus according to claim 25 further comprising a re-substituting means for re-substituting the logic element for the storage element.

\* \* \* \* \*